(12) United States Patent
Mukae

(10) Patent No.: US 12,358,647 B2
(45) Date of Patent: Jul. 15, 2025

(54) SATELLITE CONSTELLATION, GROUND FACILITY, AND FLYING OBJECT TRACKING SYSTEM

(71) Applicant: Mitsubishi Electric Corporation, Tokyo (JP)

(72) Inventor: Hisayuki Mukae, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 317 days.

(21) Appl. No.: 17/789,258

(22) PCT Filed: Feb. 19, 2021

(86) PCT No.: PCT/JP2021/006267
§ 371 (c)(1),
(2) Date: Jun. 27, 2022

(87) PCT Pub. No.: WO2021/172182
PCT Pub. Date: Sep. 2, 2021

(65) Prior Publication Data
US 2023/0031823 A1    Feb. 2, 2023

(30) Foreign Application Priority Data
Feb. 26, 2020    (JP) ................. 2020-030668

(51) Int. Cl.
*B64G 1/10*    (2006.01)
*H04B 7/185*    (2006.01)

(52) U.S. Cl.
CPC ....... *B64G 1/1085* (2013.01); *H04B 7/18519* (2013.01)

(58) Field of Classification Search
CPC ...... B64G 1/1085; B64G 3/00; B64G 1/1028; B64G 1/1021
See application file for complete search history.

(56) References Cited

U.S. PATENT DOCUMENTS

2020/0091994 A1 * 3/2020 Kalita ................. H04B 10/503

FOREIGN PATENT DOCUMENTS

| CA | 2255127 A1 * | 8/1999 | ........... B64G 1/1085 |
| JP | 2000163673 A * | 6/2000 | ............. G08B 25/00 |

(Continued)

OTHER PUBLICATIONS

Introduction to GPS and other Global Navigation Satellite Systems, Winternitz, 42nd Annual Time and Frequency Metrology Seminar Jun. 8, 2017, pp. 8-9 (Year: 2017).*

(Continued)

*Primary Examiner* — Timothy D Collins
*Assistant Examiner* — Terri L Filosi
(74) *Attorney, Agent, or Firm* — XSENSUS LLP

(57) ABSTRACT

A satellite constellation (100) includes a plurality of artificial satellites (111 to 116) that number a multiple of 6. Each of the plurality of artificial satellites orbits in an inclined circular orbit a plurality of times a day. Normals to a plurality of orbital planes corresponding to the plurality of artificial satellites are shifted by an equal angle from each other in an azimuth direction. The plurality of orbital planes make up one or more orbital plane sets each consisting of six orbital planes. Timings at which the six artificial satellites orbit on the six orbital planes of each orbital plane set are synchronized with each other.

18 Claims, 20 Drawing Sheets

(56) References Cited

FOREIGN PATENT DOCUMENTS

| | | | | |
|---|---|---|---|---|
| JP | 2006337291 A | * | 12/2006 | ............. G01C 21/00 |
| JP | 3985371 B2 | * | 10/2007 | ............. G08B 25/00 |
| JP | 4946398 B2 | | 6/2012 | |

OTHER PUBLICATIONS

International Search Report and Written Opinion mailed on May 11, 2021, received for PCT Application PCT/JP2021/006267, filed on Feb. 19, 2021, 11 pages including English Translation.

Manandhar, "Introduction to Global Navigation Satellite System (GNSS) Satellite Orbits", Training Lecture Materials from Dinesh Manandhar, GNSS Training, Course, Center for Spatial Information Science, Available Online At: https://home.csis.u-tokyo.ac.jp/-dinesh/Dinesh_T_files/GNSS-07-Introduction SatelliteOrbits.pdf, Jul. 31, 2018, pp. 1-15.

Japanese office action dated Jan. 10, 2023, for corresponding JP application No. 2022-503323, 6 pp.

\* cited by examiner

SATELLITE CONSTELLATION, GROUND FACILITY, AND FLYING OBJECT TRACKING SYSTEM

CROSS-REFERENCE TO RELATED APPLICATIONS

The present application is based on PCT filing PCT/JP2021/006267, filed Feb. 19, 2021, which claims priority to JP 2020-030668, filed Feb. 26, 2020, the entire contents of each are incorporated herein by reference.

TECHNICAL FIELD

The present disclosure relates to a satellite constellation for a surveillance system.

BACKGROUND ART

An artificial satellite called early warning satellite is known. Launch of a flying object is detected by the early warning satellite, and is dealt with by ground equipment.

Launch detection of the flying object is realized by performing, from a geostationary orbit or a high-altitude elliptic orbit, infrared detection of high-temperature vapor (plume) generated by the launch of the flying object.

In recent years, a hypersonic glide vehicle (HGV) has appeared because of sophistication of technology.

This vehicle flies while gliding near an upper limit of atmosphere. A flight direction of this vehicle can be changed by operating a propulsion device when atmospheric entry takes place.

To cope with such a flying object, demands are increasing not only for launch detection but also for prediction of a landing position by tracking the flying object at a gliding stage after firing finishes.

As a means for detecting and tracking a flying object at the gliding stage, it is promising to detect with infrared rays a temperature rise caused by atmospheric friction at the time the flying object enters the atmosphere.

However, it is feared that, different from a high-temperature atmospheric air like a plume that diffuses over a wide area, a part whose temperature rises during atmospheric entry is limited to a main body of the flying object. Also, the temperature will not rise so high as the plume. Therefore, a problem exists that detection from a geostationary orbit or a high-altitude elliptic orbit is difficult to carry out.

Monitoring from a low Earth orbit satellite group is considered promising as a means for detecting a flying object with infrared rays at the gliding stage.

In monitoring from a low Earth orbit, a distance from an artificial satellite to a flying object is shorter than in monitoring from a geostationary orbit. Therefore, detection performance by infrared rays can be improved. Monitoring from the low Earth orbit requires a large number of satellites in order to continue constant surveillance. In the United States, realization of a system with a satellite group in a scale of several hundred satellites to more than one thousand satellites has been studied. However, a large-scale system having a large number of satellites poses a problem of large cost scale.

Patent Literature 1 discloses a surveillance satellite for comprehensively monitoring a region at a particular latitude within an entire spherical surface of the Earth with using a small number of satellites orbiting in a low Earth orbit.

CITATION LIST

Patent Literature

Patent Literature 1: JP 4946398 B2

SUMMARY OF INVENTION

Technical Problem

Considering geopolitical characteristics of Japan and a threatening subject, when an objective is to monitor a flying object flying in a mid-latitude zone of the Northern Hemisphere, if Earth's periphery observation called limb view is performed from a low Earth orbit satellite group flying above the equator, constant surveillance can be conducted with a satellite group of 10 or less satellites.

However, limb view from a satellite group flying above the equator involves a problem that position identification of the flying object has a poor accuracy.

A surveillance satellite disclosed in Patent Literature 1 flies above the equator.

An objective of the present disclosure is to realize a satellite constellation for high-accuracy constant surveillance of a region in the mid-latitude zone at low cost.

Solution to Problem

A satellite constellation of the present disclosure includes a plurality of artificial satellites that number a multiple of 6.

Each of the plurality of artificial satellites orbits in an inclined circular orbit a plurality of times a day.

Normals to a plurality of orbital planes corresponding to the plurality of artificial satellites are shifted by an equal angle from each other in an azimuth direction.

The plurality of orbital planes make up one or more orbital plane sets each consisting of six orbital planes.

Timings at which six artificial satellites orbit on the six orbital planes of each orbital plane set are synchronized with each other.

Advantageous Effects of Invention

According to the present disclosure, each artificial satellite orbits in an inclined circular orbit, and accordingly high-accuracy constant surveillance of a region in the mid-latitude zone can be performed. Since orbital timings of a plurality of artificial satellites are synchronized, constant surveillance can be performed. Furthermore, if there are a plurality of artificial satellites that number a multiple of 6, a satellite constellation can be constructed, so that a satellite constellation can be realized at low cost.

DESCRIPTION OF EMBODIMENTS

In embodiments and drawings, the same or equivalent elements are denoted by the same reference sign. Description of an element denoted by the same reference sign as that of a described element will be appropriately omitted or given only briefly.

Embodiment 1

A satellite constellation 100 will be described with referring to FIGS. 1 to 11.

*Description of Configurations*

Figure 1:
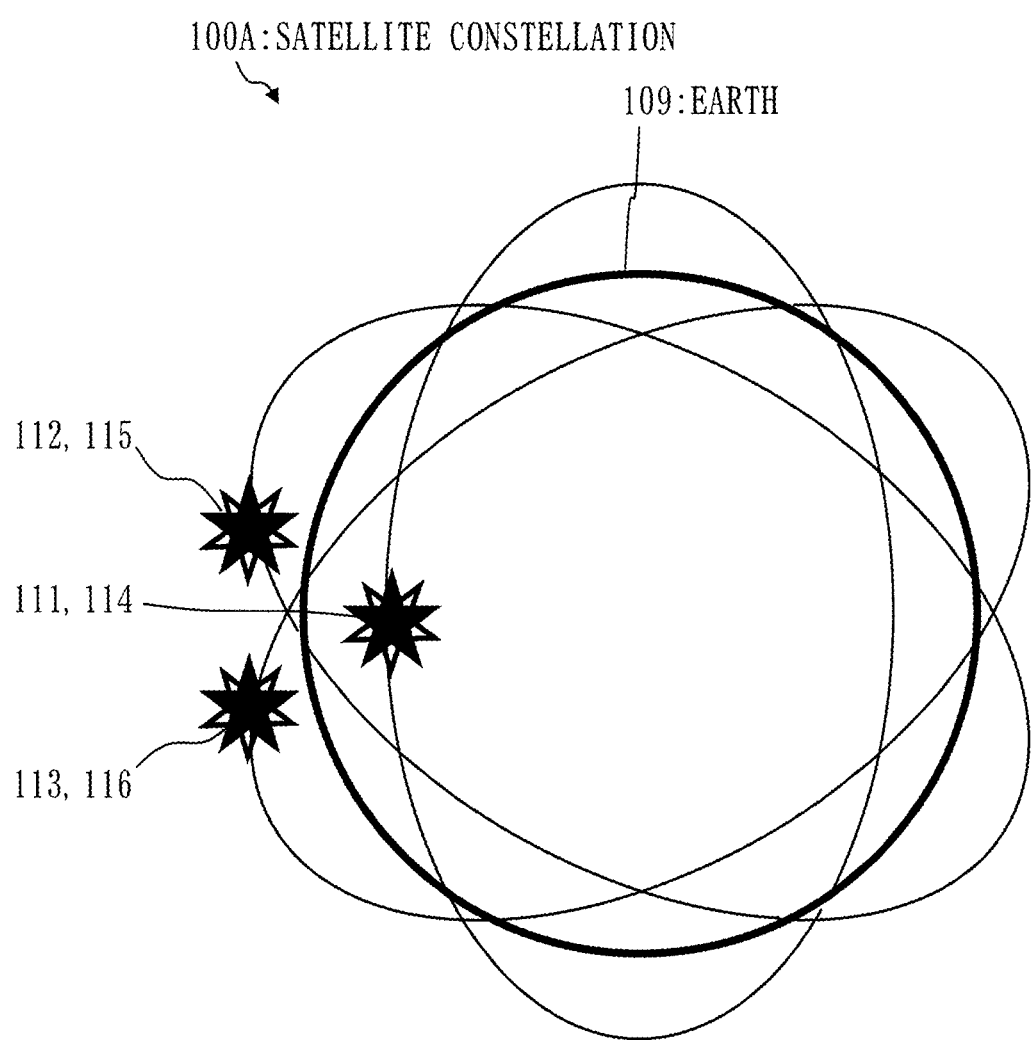
FIG. 1 is a configuration diagram of a satellite constellation 100A in Embodiment 1.

A configuration of the satellite constellation 100 and a configuration of a satellite constellation 100A will be described with referring to FIGS. 1 to 3. The satellite constellation 100A is an example of the satellite constellation 100.

Stars represent artificial satellites. Black stars represent odd-numbered artificial satellites. White stars represent even-numbered artificial satellites.

Circles enclosing the Earth 109 represent orbits in which the artificial satellites orbit. Broken-line portions (see FIGS. 2 and 3) represent portions of an orbit behind the Earth 109.

The satellite constellation 100 is provided with a plurality of artificial satellites that number a multiple of 6.

Each of the plurality of artificial satellites orbits in an inclined circular orbit a plurality of times a day. The inclined circular orbit is an inclined orbit and is a circular orbit.

The plurality of artificial satellites form a plurality of orbital planes. Normals to the plurality of orbital planes are shifted by an equal angle from each other in an azimuth direction. The azimuth direction is a direction corresponding to a traveling direction of the artificial satellite.

The plurality of artificial satellites make up one or more artificial satellite sets each consisting of six artificial satellites.

The plurality of orbital planes make up one or more orbital plane sets each consisting of six orbital planes.

Timings at which the six artificial satellites orbit on the six orbital planes are synchronized per orbital plane set.

The satellite constellation 100A is provided with six artificial satellites (111 to 116) that make up one artificial satellite set.

Each artificial satellite (111 to 116) orbits in the inclined circular orbit a plurality of times a day.

The six artificial satellites form six orbital planes. Normals to the six orbital planes are shifted by 60 degrees from each other in the azimuth direction.

The six artificial satellites make up one artificial satellite set.

The six orbital planes make up one orbital plane set.

Figure 2:
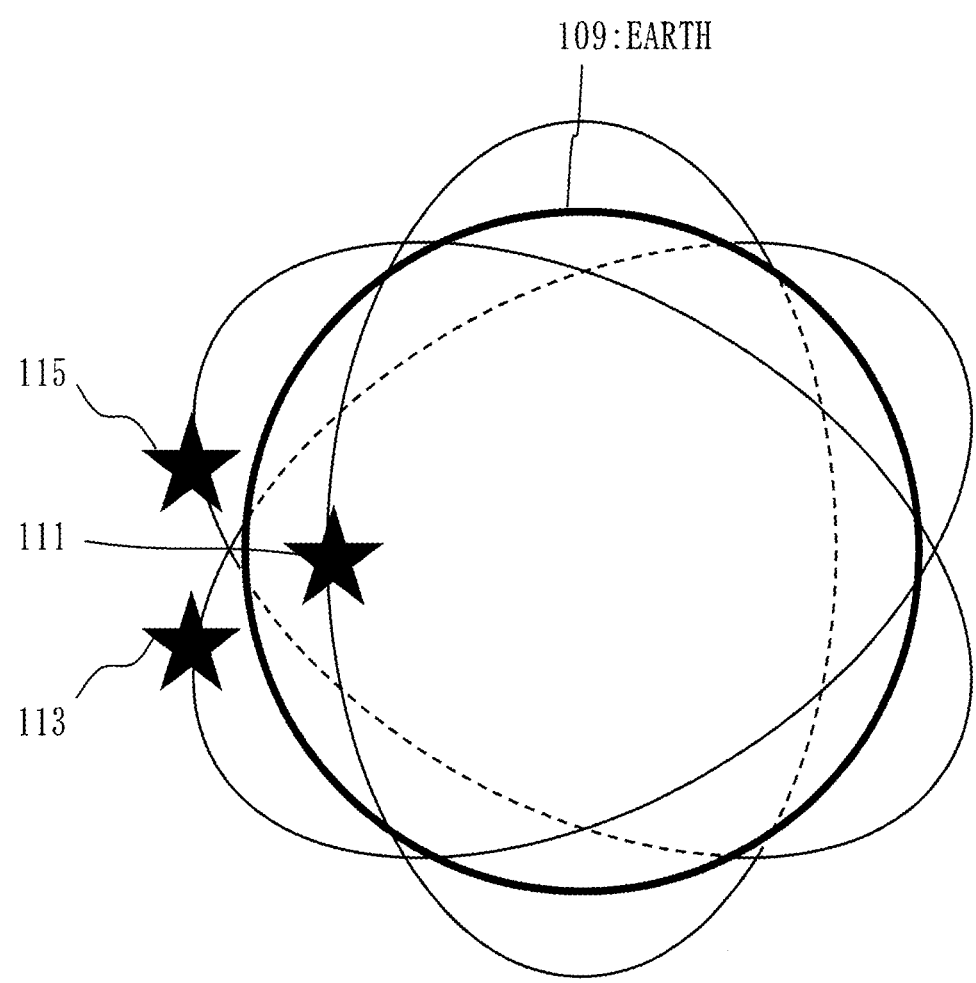
FIG. 2 is a diagram illustrating odd-numbered artificial satellites in a satellite constellation 100 in Embodiment 1.

In FIG. 2, the artificial satellite 111 is an artificial satellite that orbits on a first orbital plane. The artificial satellite 113 is an artificial satellite that orbits on a third orbital plane. The artificial satellite 115 is an artificial satellite that orbits on a fifth orbital plane.

Figure 3:
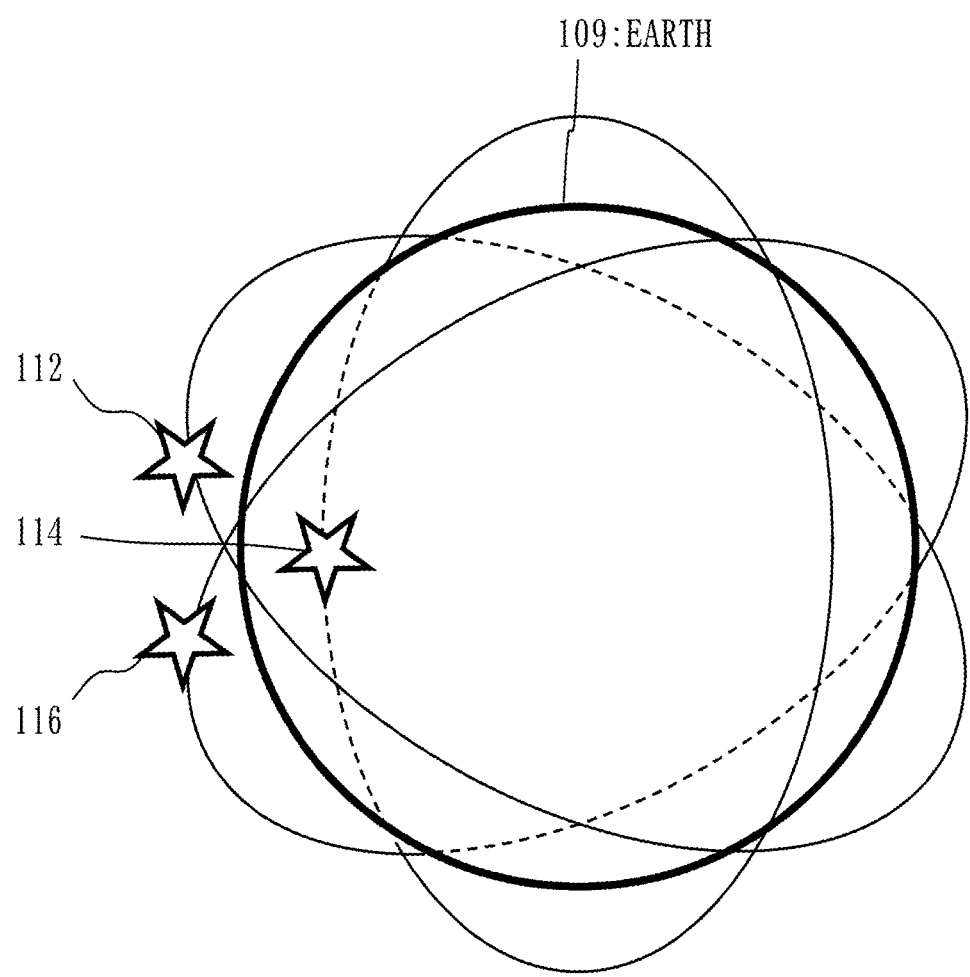
FIG. 3 is a diagram illustrating even-numbered artificial satellites in the satellite constellation 100 in Embodiment 1.

In FIG. 3, the artificial satellite 112 is an artificial satellite that orbits on a second orbital plane. The artificial satellite 114 is an artificial satellite that orbits on a fourth orbital plane. The artificial satellite 116 is an artificial satellite that orbits on a sixth orbital plane.

Figure 4:
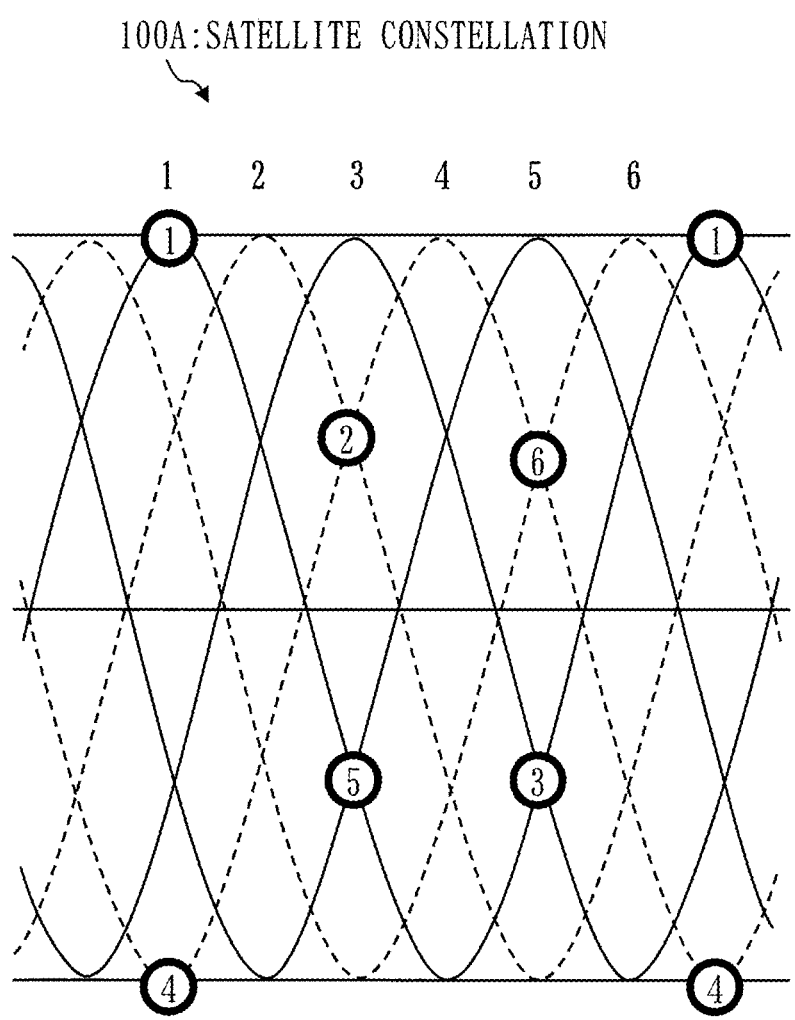
FIG. 4 is a diagram illustrating satellite layout of the satellite constellation 100A in Embodiment 1.

Satellite layout of the satellite constellation 100A will be described with referring to FIG. 4.

Solid-line waveforms represent orbits of the odd-numbered artificial satellites. Broken-line waveforms represent orbits of the even-numbered artificial satellites.

A vertical direction expresses latitude. A horizontal direction expresses longitude.

An upper end of each orbit corresponds to a northernmost end of the orbit. A lower end of each orbit corresponds to a southernmost end of the orbit.

A portion corresponding to the northernmost end of each orbit is denoted by a number for that orbit.

A circle denoted by a number m represents an mth artificial satellite where "m" is an integer of 1 or more.

The mth artificial satellite will be referred to as an artificial satellite (m). An orbit of the artificial satellite (m) will be referred to as an orbit (m).

A timing at which an artificial satellite (1) passes through a northernmost end of an orbital plane (1) will be referred to as a timing (1).

The timing (1) is synchronized with following timings (3) and (5).

The timing (3) is a timing at which an artificial satellite (3) passes through a point that is in-plane phase-shifted by plus 120 degrees from a northernmost end of an orbital plane (3).

The timing (5) is a timing at which an artificial satellite (5) passes through a point that is in-plane phase-shifted by plus 240 degrees from a northernmost end of an orbital plane (5).

The in-plane phase signifies a phase within the orbital plane.

A plus direction in the in-plane phase is a direction opposite to a traveling direction of the artificial satellite. That is, a minus direction in the in-plane phase is the same direction as the traveling direction of the artificial satellite.

The timing (1) is synchronized with following timings (4), (6), and (2) as well.

The timing (4) is a timing at which an artificial satellite (4) passes through a southernmost end of an orbital plane (4).

The timing (6) is a timing at which an artificial satellite (6) passes through a point that is in-plane phase-shifted by plus 120 degrees from a southernmost end of an orbital plane (6).

The timing (2) is a timing at which an artificial satellite (2) passes through a point that is in-plane phase-shifted by plus 240 degrees from a southernmost end of an orbital plane (2).

Figure 5:
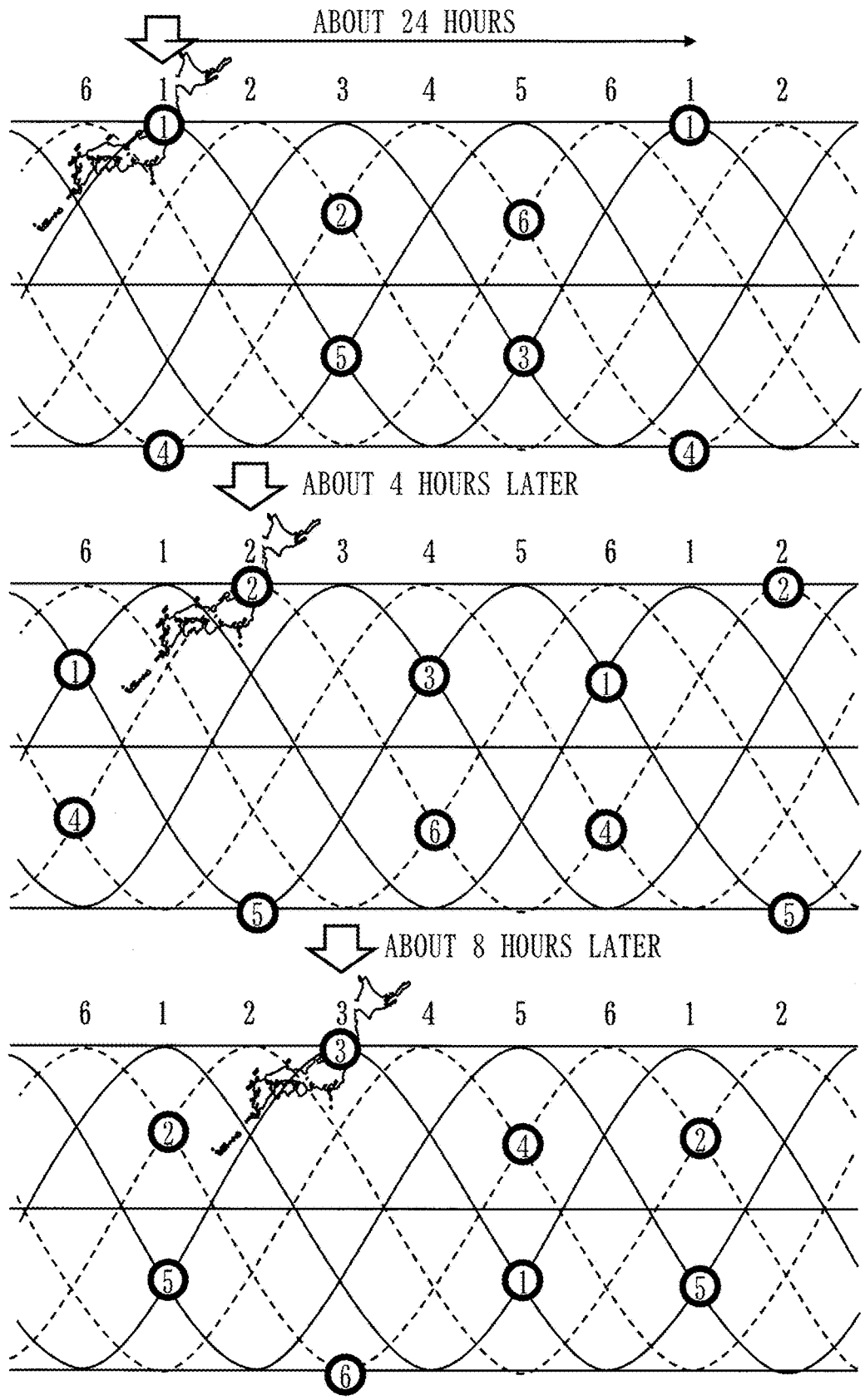
FIG. 5 is a diagram illustrating changes in satellite layout of the satellite constellation 100A in Embodiment 1.
Figure 6:
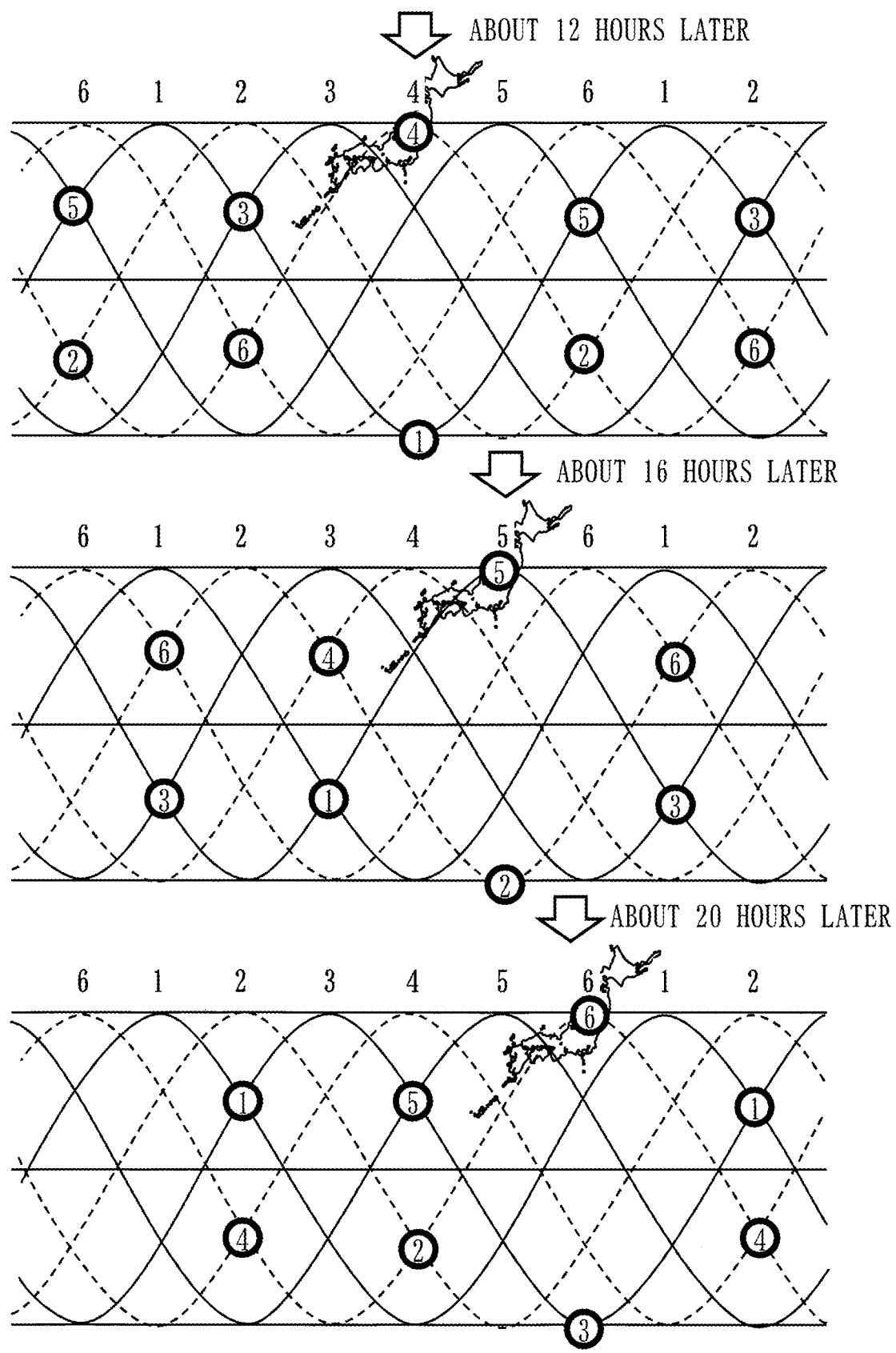
FIG. 6 is a diagram illustrating changes in satellite layout of the satellite constellation 100A in Embodiment 1.

FIGS. 5 and 6 illustrate changes in an in-plane phase of the six artificial satellites which occur as time passes.

The following explains how the six artificial satellites pass through the northernmost ends of their orbital planes in turn at particular time intervals.

Each artificial satellite monitors an object (flying object) flying above Japan during, for example, a time span where the artificial satellite passes through the northernmost end of the orbital plane. The flying object is an example of a monitoring target. Japan is an example of a region to be monitored (monitoring region). As the Earth 109 rotates, the artificial satellites pass through the northernmost ends of their orbital planes above Japan.

First, the artificial satellite (1) passes through the northernmost end of an orbit (1) above Japan.

About 4 hours later, the artificial satellite (2) passes through the northernmost end of an orbit (2) above Japan.

About 8 hours later, the artificial satellite (3) passes through the northernmost end of an orbit (3) above Japan.

About 12 hours later, the artificial satellite (4) passes through the northernmost end of an orbit (4) above Japan.

About 16 hours later, the artificial satellite (5) passes through the northernmost end of an orbit (5) above Japan.

About 20 hours later, the artificial satellite (6) passes through the northernmost end of an orbit (6) above Japan.

About 24 hours later, the artificial satellite (1) passes through the northernmost end of an orbit (1) above Japan again.

Each artificial satellite orbits a multiple of times until it passes through the northernmost end of the orbit about 24 hours later.

If each artificial satellite can monitor a monitoring region for 4 hours continuously from 2 hours before it passes through the northernmost end of the orbit until 2 hours after it passes through the northernmost end of the orbit, it is possible to constantly monitor the monitoring region.

In the case of visible observation, there is a restriction that a number of times of orbiting per day is an integer so that each artificial satellite can pass through the northernmost end of the orbit in 24 hours. Hence, it is rational to regulate a geometric relationship between the sun and each artificial satellite.

In the case of infrared observation, however, there is no restriction that a number of times of orbiting per day is an integer. That is, a number of times of orbiting per day need not be an integer multiple.

If it is difficult to monitor the monitoring region for 4 hours continuously for each of the six artificial satellites that make up the satellite constellation 100, the number of artificial satellites making up the satellite constellation 100 may be increased to a multiple of 6. This enables constant surveillance of the monitoring region.

The number of artificial satellites making up the satellite constellation 100 may be selected in accordance with satellite altitudes, orbit inclinations, and monitoring performances. For example, monitoring performance is performance of infrared-ray detection.

The satellite constellation 100 is formed of, for example, 12 artificial satellites.

Each of the 12 artificial satellites orbits in an inclined circular orbit a plurality of times a day.

The 12 artificial satellites form 12 orbital planes. Normals to the 12 orbital planes are shifted by 30 degrees from each other in the azimuth direction.

The 12 artificial satellites form two artificial satellite sets. The artificial satellites (1) to (6) form the first artificial satellite set. The artificial satellites (7) to (12) form the second artificial satellite set.

The 12 orbital planes form two orbital plane sets. The orbital planes (1) to (6) form a first orbital plane set. The orbital planes (7) to (12) form a second orbital plane set.

Figure 7:
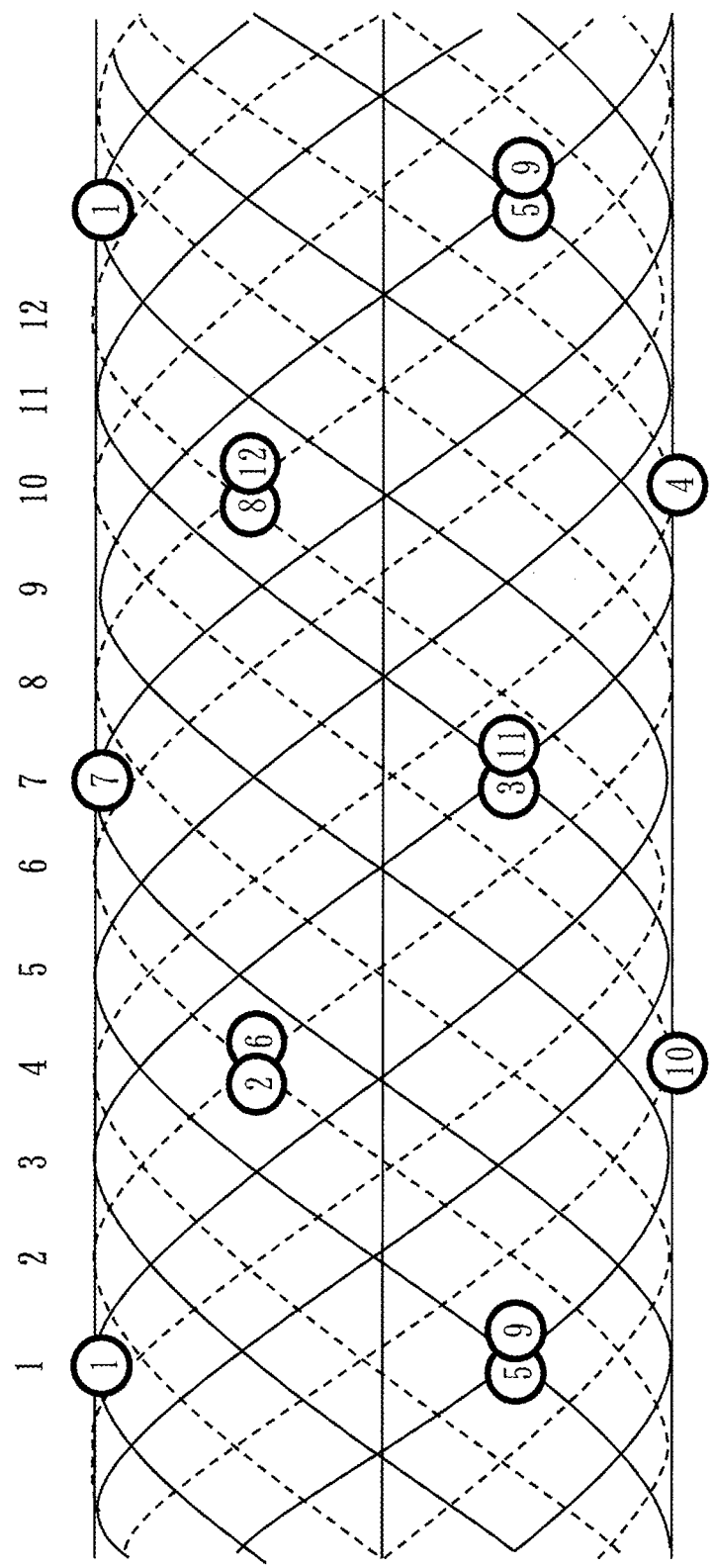
FIG. 7 is a diagram illustrating satellite layout of a satellite constellation 100B in Embodiment 1.

Satellite layout of a satellite constellation 100B will be described with referring to FIG. 7.

The satellite constellation 100B is an example of the satellite constellation 100 and is provided with 12 artificial satellites.

Note that "n" signifies an integer of 0 or more to 1 or less, and that "x" signifies an integer of 1 or more to 6 or less.

An artificial satellite (6n+x) signifies an xth artificial satellite in an (n+1)th artificial satellite set.

An orbital plane (6n+x) signifies an xth orbital plane in an (n+1)th orbital plane set.

Note that "T" signifies an orbital period of each artificial satellite, and that "T/2" signifies a time that is half an orbital period of each artificial satellite. The orbital period is a time required for each artificial satellite to perform orbiting once in an inclined circular orbit.

A timing at which an artificial satellite (6n+1) passes through an orbital plane (6n+1) will be referred to as a timing (1).

The timing (1) is synchronized with following timings (3) and (5).

The timing (3) is a timing at which an artificial satellite (6n+3) passes through a point that is in-plane phase-shifted by plus 120 degrees from a northernmost end of an orbital plane (6n+3).

The timing (5) is a timing at which an artificial satellite (6n+5) passes through a point that is in-plane phase-shifted by plus 240 degrees from a northernmost end of an orbital plane (6n+5).

A timing at which an artificial satellite (6n+4) passes through a point of an in-plane phase on an orbital plane (6n+4) will be referred to as a timing (4).

The timing (4) is synchronized with following timings (6) and (2).

The timing (6) is a timing at which an artificial satellite (6n+6) passes through, on an orbital plane (6n+6), a point that is in-plane phase-shifted by plus 120 degrees from a point corresponding to an in-plane phase of the artificial satellite (6n+4).

The timing (2) is a timing at which an artificial satellite (6n+2) passes through, on an orbital plane (6n+2), a point that is in-plane phase-shifted by plus 240 degrees from a point corresponding to an in-plane phase of the artificial satellite (6n+4).

The artificial satellite (6n+4) passes through the northernmost end of the orbital plane (6n+4) at a timing when T/2 elapses after the artificial satellite (6n+1) passes through the northernmost end of the orbital plane (6n+1).

The satellite constellation 100 is formed of, for example, 18 artificial satellites.

Each of the 18 artificial satellites orbits in an inclined circular orbit a plurality of times a day.

The 18 artificial satellites form 18 orbital planes. Normals to the 18 orbital planes are shifted by 20 degrees from each other in the azimuth direction.

The 18 artificial satellites form three artificial satellite sets. The artificial satellites (1) to (6) form the first artificial satellite set. The artificial satellites (7) to (12) form the second artificial satellite set. The artificial satellites (13) to (18) form the third artificial satellite set.

The 18 orbital planes form three orbital plane sets. The orbital planes (1) to (6) form a first orbital plane set. The orbital planes (7) to (12) form a second orbital plane set. The orbital planes (13) to (18) form a third orbital plane set.

Figure 8:
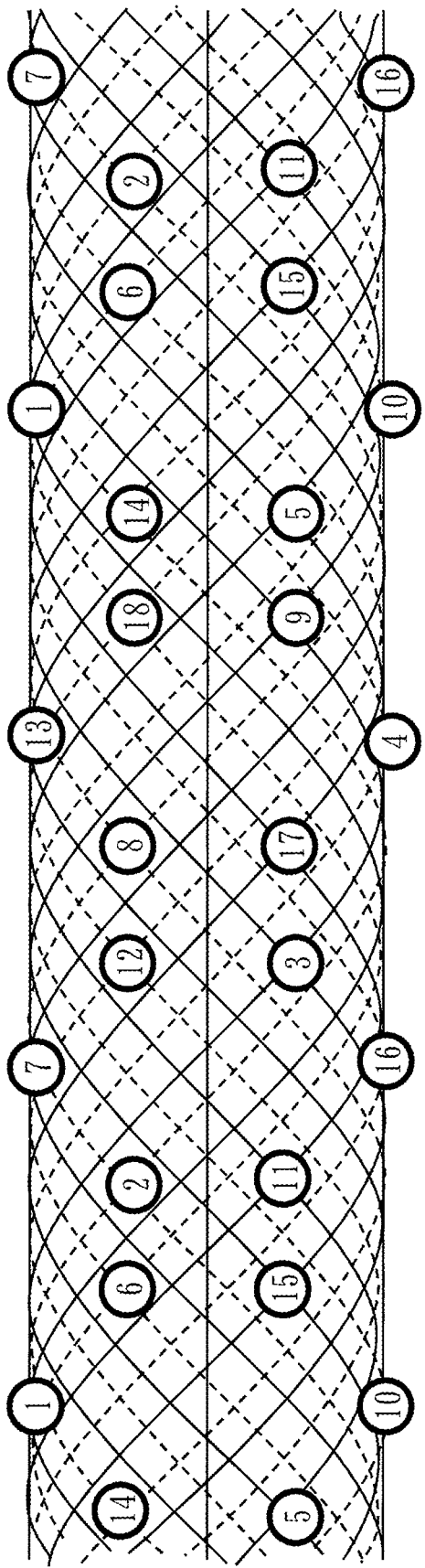
FIG. 8 is a diagram illustrating satellite layout of a satellite constellation 100C in Embodiment 1.

Satellite layout of a satellite constellation 100C will be described with referring to FIG. 8.

The satellite constellation 100C is an example of the satellite constellation 100 and is provided with 18 artificial satellites.

Note that "n" signifies an integer of 0 or more to 2 or less, and that "x" signifies an integer of 1 or more to 6 or less.

An artificial satellite (6n+x) signifies an xth artificial satellite in an (n+1)th artificial satellite set.

An orbital plane (6n+x) signifies an xth orbital plane in an (n+1)th orbital plane set.

A timing at which an artificial satellite (6n+1) passes through an orbital plane (6n+1) will be referred to as a timing (1).

The timing (1) is synchronized with following timings (3) and (5).

The timing (3) is a timing at which an artificial satellite (6n+3) passes through a point that is in-plane phase-shifted by plus 120 degrees from a northernmost end of an orbital plane (6n+3).

The timing (5) is a timing at which an artificial satellite (6n+5) passes through a point that is in-plane phase-shifted by plus 240 degrees from a northernmost end of an orbital plane (6n+5).

The timing (1) is synchronized with following timings (4), (6), and (2) as well.

The timing (4) is a timing at which an artificial satellite (6n+4) passes through a southernmost end of an orbital plane (6n+4).

The timing (6) is a timing at which an artificial satellite (6n+6) passes through a point that is in-plane phase-shifted by plus 120 degrees from a southernmost end of an orbital plane (6n+6).

The timing (2) is a timing at which an artificial satellite (6n+2) passes through a point that is in-plane phase-shifted by plus 240 degrees from a southernmost end of an orbital plane (6n+2).

On the plurality of orbital planes, the in-plane phases of the artificial satellites may be shifted in a minus direction instead of in a plus direction.

Satellite layout of a case where the in-plane phases of the artificial satellites are shifted in a minus direction is different from satellite layout of a case where the in-plane phases of the artificial satellites are shifted in a plus direction.

Satellite layout of a satellite constellation 100D will be described with referring to FIG. 9.

The satellite constellation 100D is an example of the satellite constellation 100 and is provided with six artificial satellites.

A timing at which an artificial satellite (1) passes through a northernmost end of an orbital plane (1) will be referred to as a timing (1).

The timing (1) is synchronized with following timings (3) and (5).

The timing (3) is a timing at which an artificial satellite (3) passes through a point that is in-plane phase-shifted by minus 120 degrees from a northernmost end of an orbital plane (3).

The timing (5) is a timing at which an artificial satellite (5) passes through a point that is in-plane phase-shifted by minus 240 degrees from a northernmost end of an orbital plane (5).

The timing (1) is synchronized with following timings (4), (6), and (2) as well.

The timing (4) is a timing at which an artificial satellite (4) passes through a southernmost end of an orbital plane (4).

The timing (6) is a timing at which an artificial satellite (6) passes through a point that is in-plane phase-shifted by minus 120 degrees from a southernmost end of an orbital plane (6).

The timing (2) is a timing at which an artificial satellite (2) passes through a point that is in-plane phase-shifted by minus 240 degrees from a southernmost end of an orbital plane (2).

Figure 9:
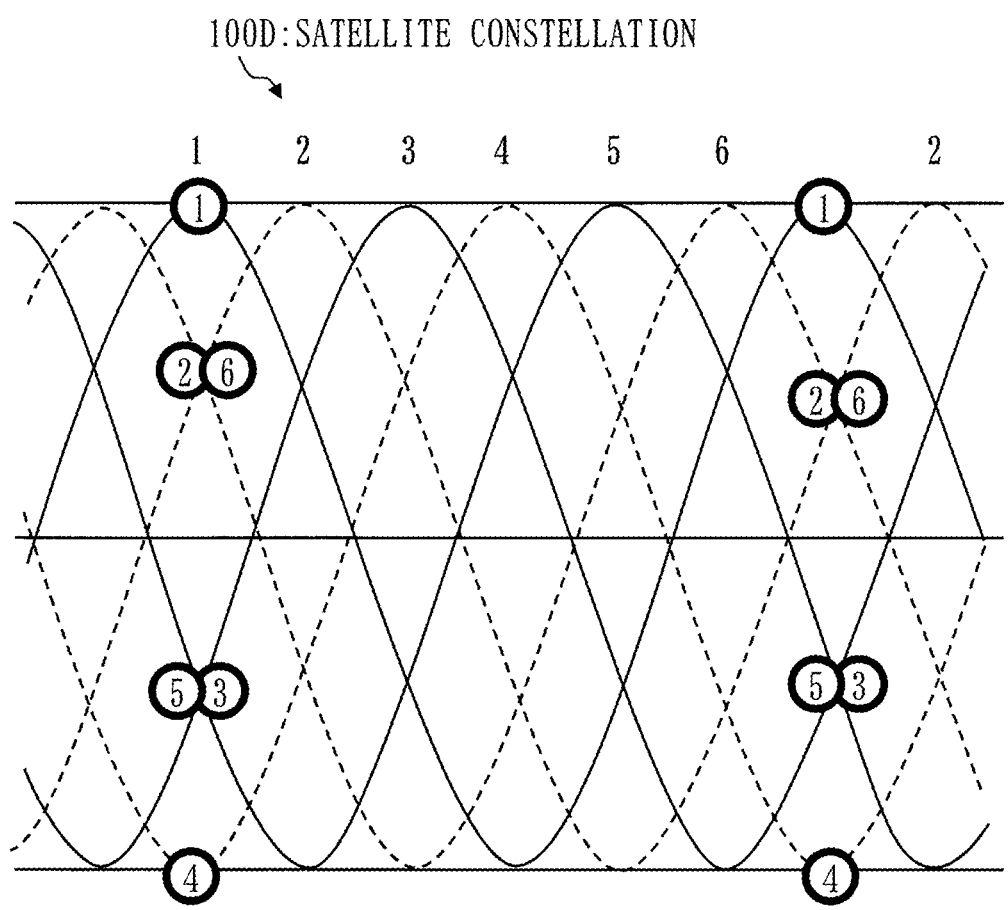
FIG. 9 is a diagram illustrating satellite layout of a satellite constellation 100D in Embodiment 1.

In FIG. 9, the six artificial satellites cluster at almost the same longitude. However, as time passes, the six artificial satellites disperse. The artificial satellites monitor a monitoring region each for about 4 hours.

Figure 10:
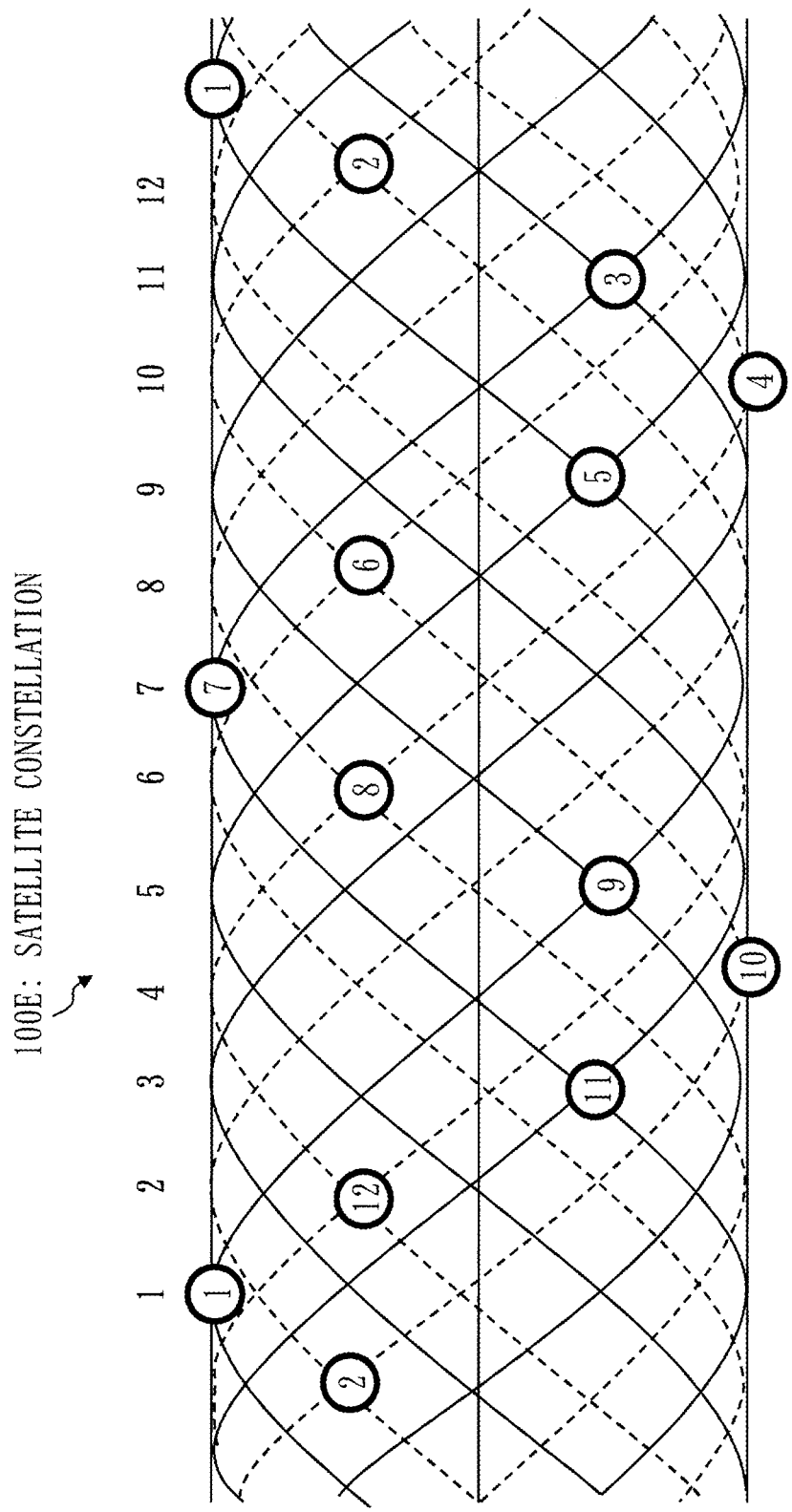
FIG. 10 is a diagram illustrating satellite layout of a satellite constellation 100E in Embodiment 1.

Satellite layout of a satellite constellation 100D will be described with referring to FIG. 10.

The satellite constellation 100D is an example of the satellite constellation 100 and is provided with 12 artificial satellites.

Note that "n" signifies an integer of 0 or more to 1 or less, and that "T/2" signifies a time that is half an orbital period of each artificial satellite.

A timing at which an artificial satellite (6n+1) passes through an orbital plane (6n+1) will be referred to as a timing (1).

The timing (1) is synchronized with following timings (3) and (5).

The timing (3) is a timing at which an artificial satellite (6n+3) passes through a point that is in-plane phase-shifted by minus 120 degrees from a northernmost end of an orbital plane (6n+3).

The timing (5) is a timing at which an artificial satellite (6n+5) passes through a point that is in-plane phase-shifted by minus 240 degrees from a northernmost end of an orbital plane (6n+5).

A timing at which an artificial satellite (6n+4) passes through a point of an in-plane phase on an orbital plane (6n+4) will be referred to as a timing (4).

The timing (4) is synchronized with following timings (6) and (2).

The timing (6) is a timing at which an artificial satellite (6n+6) passes through, on an orbital plane (6n+6), a point that is in-plane phase-shifted by minus 120 degrees from a point corresponding to an in-plane phase of the artificial satellite (6n+4).

The timing (2) is a timing at which an artificial satellite (6n+2) passes through, on an orbital plane (6n+2), a point that is in-plane phase-shifted by minus 240 degrees from a point corresponding to an in-plane phase of the artificial satellite (6n+4).

The artificial satellite (6n+4) passes through the northernmost end of the orbital plane (6n+4) at a timing when T/2 elapses after the artificial satellite (6n+1) passes through the northernmost end of the orbital plane (6n+1).

Figure 11:
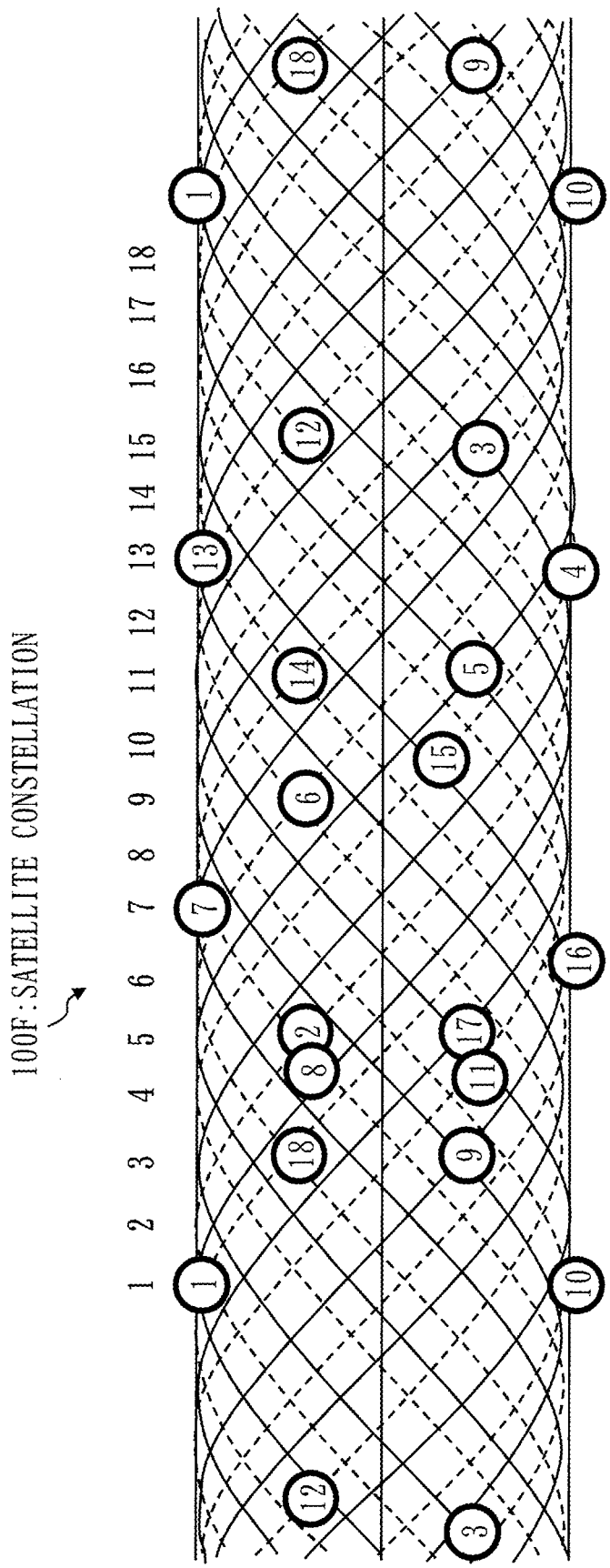
FIG. 11 is a diagram illustrating satellite layout of a satellite constellation 100F in Embodiment 1.

Satellite layout of a satellite constellation 100F will be described with referring to FIG. 11.

The satellite constellation 100F is an example of the satellite constellation 100 and is provided with 18 artificial satellites.

Note that "n" signifies an integer of 0 or more to 2 or less.

A timing at which an artificial satellite (6n+1) passes through an orbital plane (6n+1) will be referred to as a timing (1).

The timing (1) is synchronized with following timings (3) and (5).

The timing (3) is a timing at which an artificial satellite (6n+3) passes through a point that is in-plane phase-shifted by minus 120 degrees from a northernmost end of an orbital plane (6n+3).

The timing (5) is a timing at which an artificial satellite (6n+5) passes through a point that is in-plane phase-shifted by minus 240 degrees from a northernmost end of an orbital plane (6n+5).

The timing (1) is synchronized with following timings (4), (6), and (2) as well.

The timing (4) is a timing at which an artificial satellite (6n+4) passes through a southernmost end of an orbital plane (6n+4).

The timing (6) is a timing at which an artificial satellite (6n+6) passes through a point that is in-plane phase-shifted by minus 120 degrees from a southernmost end of an orbital plane (6n+6).

The timing (2) is a timing at which an artificial satellite (6n+2) passes through a point that is in-plane phase-shifted by minus 240 degrees from a southernmost end of an orbital plane (6n+2).

*Summary and Supplement of Embodiment 1*

In Embodiment 1, a plurality of orbital planes are arranged at equal intervals in the azimuth direction. Odd-numbered orbital planes are shifted relative from each other by 120 degrees in an elevation direction so that the artificial satellites disperse in a north-south direction. Furthermore, even-numbered artificial satellites are synchronized at a timing to complement gaps between the odd-numbered artificial satellites.

As a means for dispersing the plurality of artificial satellites in the north-south direction, there is a method of shifting by plus 120 degrees and a method of shifting by minus 120 degrees. When monitoring a monitoring region with the plurality of artificial satellites, a situation of change over time of the monitoring region differs according to the flying direction of each artificial satellite and an effect of the Earth's rotation. Therefore, a means suitable for constant surveillance can be adopted in accordance with an orbital altitude and an orbital inclination.

In Embodiment 1, the satellite constellation 100 is provided with the plurality of artificial satellites that number a multiple of 6.

Each of the plurality of artificial satellites orbits in an inclined circular orbit a plurality of times a day.

The plurality of artificial satellites form a plurality of orbital planes. Normals to the plurality of orbital planes are shifted by an equal angle from each other in an azimuth direction.

For example, satellite layout that is rational for constantly monitoring a monitoring region of the northern hemisphere is decided. The plurality of artificial satellites are sync-controlled, and the satellite constellation 100 is put into operation.

In monitoring with a visible optical sensor, a condition of sunlight incident on a monitoring target concerns an observation performance. Hence, a sun-synchronous orbit is usually used. However, in infrared-ray detection that detects an object temperature, a relative relationship between the sun and the monitoring target is not a restrictive condition. Therefore, in monitoring by infrared-ray detection, an orbital altitude and an orbital inclination that are suitable for constantly monitoring the monitoring target can be selected freely.

When the orbital altitude is approximately 3,000 kilometers, the monitoring region of the northern hemisphere can be constantly monitored with 10 or less artificial satellites.

To improve the performance of infrared-ray detection, however, the orbital altitude must be lowered to approximately 1,000 kilometers. In that case, because of the limitation of the field-of-view range due to the effect of the Earth's shape, 10 or more artificial satellites are required.

The smaller the orbital inclination is, that is, the smaller the inclination of the orbit with respect to the equator is, the more the number of satellites necessary for constant surveillance can be reduced. Then, however, a high-latitude region cannot be monitored. Therefore, it is necessary to take into consideration a balance between an altitude of the satellite orbit and the latitude of the monitoring region. If the orbital inclination is set at an angle within a range of approximately 150 degrees to approximately 120 degrees, each artificial satellite flies within a latitude range of plus 30 degrees to plus 60 degrees or within a latitude range of minus 30 degrees to minus 60 degrees. Under this condition, a minimum number of satellites that can be constantly monitored is found.

To realize constant surveillance with a small number of satellites, it is rational to sync-control the artificial satellites such that the artificial satellites pass through the northernmost ends of the orbital planes at the same intervals. If the number of orbital planes is small, it is rational to disperse the artificial satellites in the north-south direction as well.

*Effect of Embodiment 1*

According to Embodiment 1, a satellite constellation for constantly monitoring a monitoring region can be realized at a low cost. For example, a satellite constellation is realized in which each artificial satellite orbits in a low Earth orbit in order to detect a flying object at a gliding stage.

By employing an inclined orbit, it is possible to monitor a flying object being a threat, from the sky instead of by limb view. As a result, positioning accuracy improves.

Embodiment 2

A surveillance system 200 will be described mainly regarding its difference from Embodiment 1 with referring to FIGS. 12 to 16.

The surveillance system 200 is a system to perform monitoring with a satellite constellation 201.

The satellite constellation 201 corresponds to the satellite constellation 100 (see Embodiment 1).

*Description of Configurations*

Figure 12:
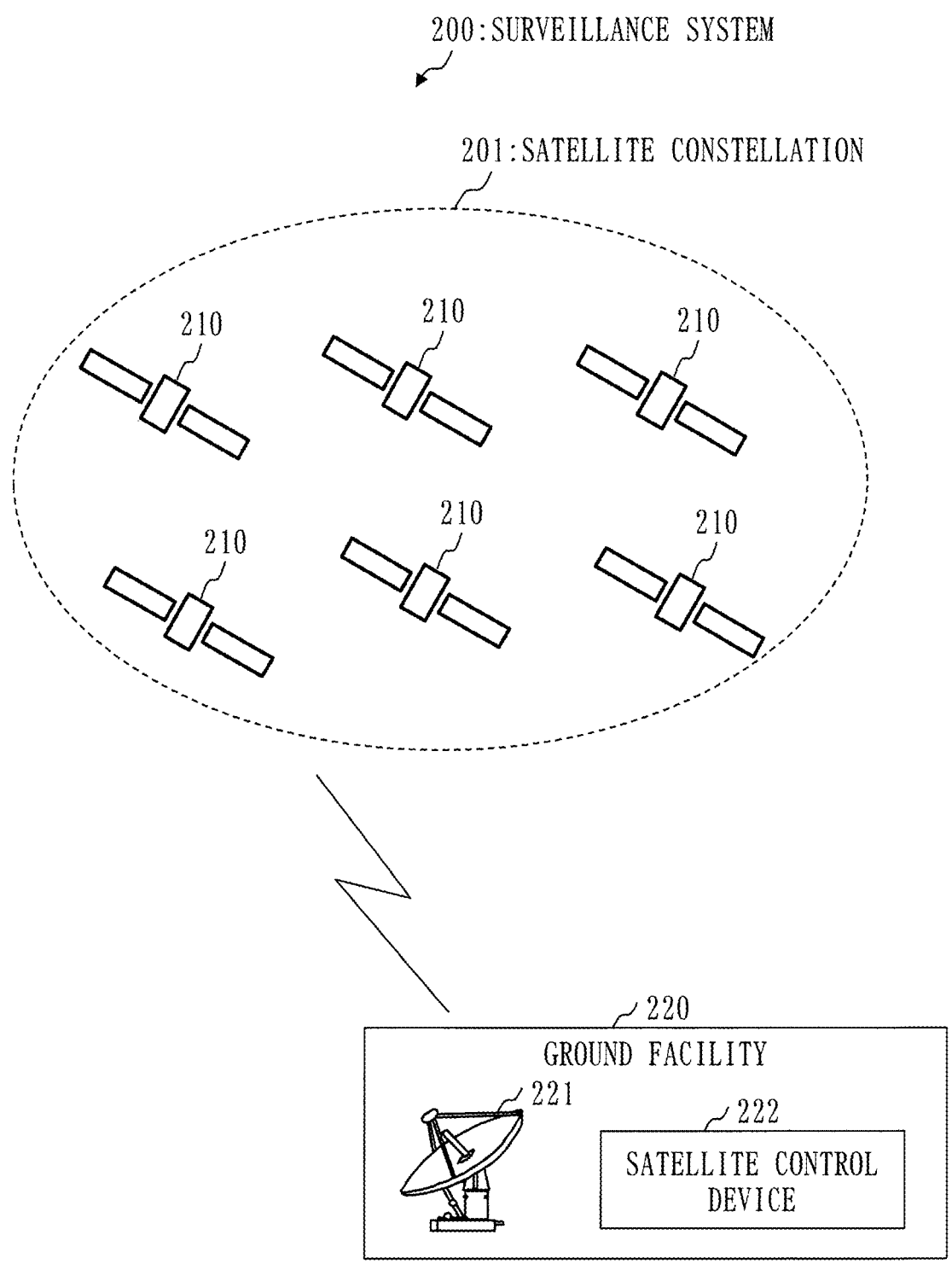
FIG. 12 is a configuration diagram of a surveillance system 200 in Embodiment 2.

A configuration of the surveillance system 200 will be described with referring to FIG. 12.

The surveillance system 200 is provided with the satellite constellation 201.

The satellite constellation 201 is provided with a plurality of artificial satellites 210 that number a multiple of 6.

The surveillance system 200 is provided with a ground facility 220.

The ground facility 220 is provided with a communication device 221 and a satellite control device 222 and communicates with each artificial satellite 210, thereby controlling the satellite constellation 201. Specifically, the ground facility 220 performs control to synchronize the plurality of artificial satellites 210 that make up the satellite constellation 201.

The satellite control device 222 is a computer that generates various types of commands for controlling each artificial satellite 210, and is provided with hardware devices such as processing circuitry and an input/output interface. The processing circuitry generates the various types of commands. An input device and an output device are connected to the input/output interface. The satellite control device 222 is connected to the communication device 221 via the input/output interface.

The communication device 221 communicates with each artificial satellite 210. Specifically, the communication device 221 transmits the various types of commands to each artificial satellite 210. The communication device 221 receives monitor data transmitted from each artificial satellite 210.

Figure 13:
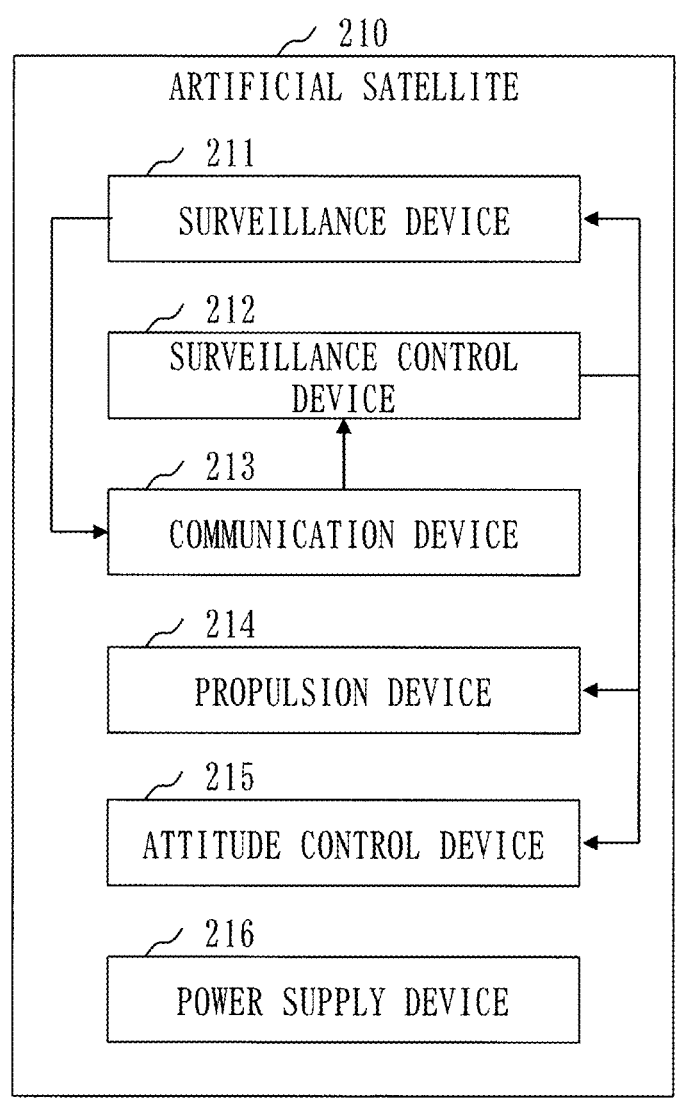
FIG. 13 is a configuration diagram of an artificial satellite 210 in Embodiment 2.

A configuration of the artificial satellite 210 will be described with referring to FIG. 13.

The artificial satellite 210 is provided with a surveillance device 211, a surveillance control device 212, a communication device 213, a propulsion device 214, an attitude control device 215, and a power supply device 216.

The surveillance device 211 is a device to perform monitoring and generates monitor data. The monitor data is data corresponding to an image that shows a monitoring target. Specifically, the surveillance device 211 is an infrared-ray detection device. Alternatively, the artificial satellite 111 may be a visible optical sensor, a synthetic aperture radar (SAR), or the like.

The surveillance control device 212 is a computer that controls the surveillance device 211, the propulsion device 214, and the attitude control device 215, and is provided with processing circuitry. Specifically, the surveillance control device 212 controls the surveillance device 211, the propulsion device 214, and the attitude control device 215 in accordance with the various types of commands transmitted from the ground facility 220.

The communication device 213 is a device that communicates with the ground facility 220. Specifically, the communication device 213 transmits the monitor data to the ground facility 220. The communication device 213 also receives the various types of commands transmitted from the ground facility 220.

The propulsion device 214 is a device that supplies a propulsion force to the artificial satellite 210 and changes a speed of the artificial satellite 210. Specifically, the propulsion device 214 is an electric propulsion machine. For example, the propulsion device 214 is an ion engine or a Hall thruster.

The attitude control device 215 is a device to control attitude elements such as an attitude of the artificial satellite 210, an angular speed of the artificial satellite 210, and a field-of-view direction of the surveillance device 211. The attitude control device 215 changes the attitude elements for desired directions. Alternatively, the attitude control device 215 maintains the attitude elements in desired directions. The attitude control device 215 is provided with an attitude sensor, an actuator, and a controller. The attitude sensor is a gyro scope, an Earth sensor, a sun sensor, a star tracker, a thruster, a magnetic sensor, or the like. The actuator is an attitude control thruster, a momentum wheel, a reaction wheel, a control moment gyro, or the like.

The controller controls the actuator in accordance with measurement data of the attitude sensor or the various types of commands transmitted from the ground facility 220.

The power supply device 216 is provided with a solar cell, a battery, a power control device, and so on and supplies power to apparatuses mounted in the artificial satellite 210.

The processing circuitry provided to each of the surveillance control device 212 and the satellite control device 222 will be described.

The processing circuitry may be dedicated hardware, or a processor that executes a program stored in a memory.

In the processing circuitry, some of functions may be implemented by dedicated hardware, and remaining functions may be implemented by software or firmware. That is, the processing circuitry can be implemented by hardware, software, or firmware; or a combination of hardware, software, and firmware.

The dedicated hardware is, for example, a single circuit, a composite circuit, a programmed processor, a parallel-programmed processor, an ASIC, or an FPGA; or a combination of a single circuit, a composite circuit, a programmed processor, a parallel-programmed processor, an ASIC, and an FPGA, ASIC stands for Application Specific Integrated Circuit.

FPGA stands for Field Programmable Gate Array.

A pointing function of the artificial satellite 210 will be described.

The artificial satellite 210 has the pointing function to turn a monitoring direction toward a monitoring target.

For example, the artificial satellite 210 is provided with a reaction wheel. The reaction wheel is a device to control the attitude of the artificial satellite 210. The reaction wheel controls the attitude of the artificial satellite 210, thereby realizing body pointing.

For example, the artificial satellite 210 is provided with a pointing mechanism. The pointing mechanism is a mechanism to change the field-of-view direction of the surveillance device 211. For example, a driving mirror or the like is utilized as the pointing mechanism.

Figure 14:
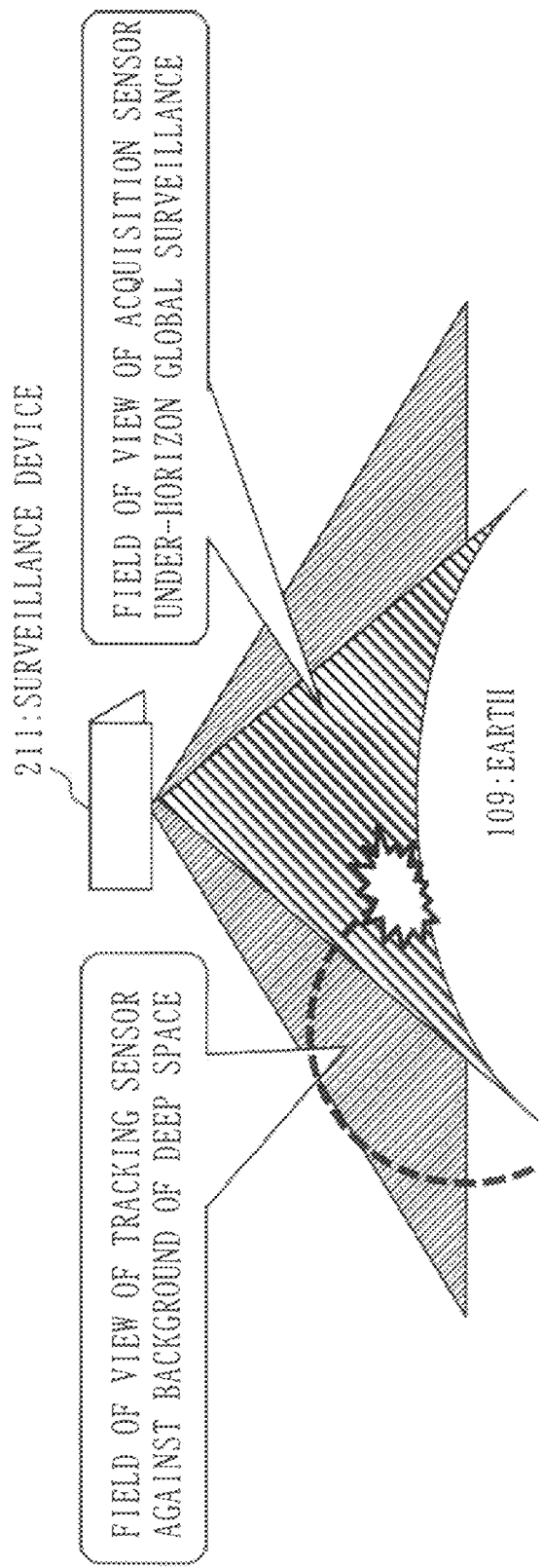
FIG. 14 is a diagram illustrating a field of view of a surveillance device 211 in Embodiment 2.

The surveillance device 211 mounted in each artificial satellite 210 will be described with referring to FIG. 14.

The surveillance device 211 is provided with both or one of an acquisition sensor and a tracking sensor.

The acquisition sensor monitors the Earth surface from the sky. The acquisition sensor monitors the surface of the Earth from the sky, thereby detecting launch of a flying object.

The tracking sensor monitors an Earth's limb against the background of outer space. The tracking sensor monitors the Earth's limb against the background of outer space, thereby monitoring a flying object at a post-boost stage.

When both the acquisition sensor and the tracking sensor are employed, launch detection accuracy and position identification accuracy are improved.

Adjustment of a satellite altitude and of an orbital inclination will be described.

A relative angle of the normal to the orbital plane of each artificial satellite 210 seen from the North Pole side is determined on the basis of a correlation between the satellite altitude and the orbital inclination.

Under an altitude condition of maintaining a number of times of orbiting per day, when an appropriate orbital inclination is finely adjusted, the satellite constellation 201 can be operated while the relative angle between the orbital planes is maintained.

The satellite control device 222 generates a command for controlling the altitude of each artificial satellite 210. The satellite control device 222 also generates a command for controlling the orbital inclination of each artificial satellite 210. The communication device 221 transmits these commands to each artificial satellite 210.

In each artificial satellite 210, the surveillance control device 212 adjusts the satellite attitude and the orbital inclination in accordance with these commands. Specifically, the surveillance control device 212 controls the propulsion device 214 in accordance with these commands. The propulsion device 214 changes the satellite speed, so that the satellite altitude and the orbital inclination can be adjusted.

Figure 15:
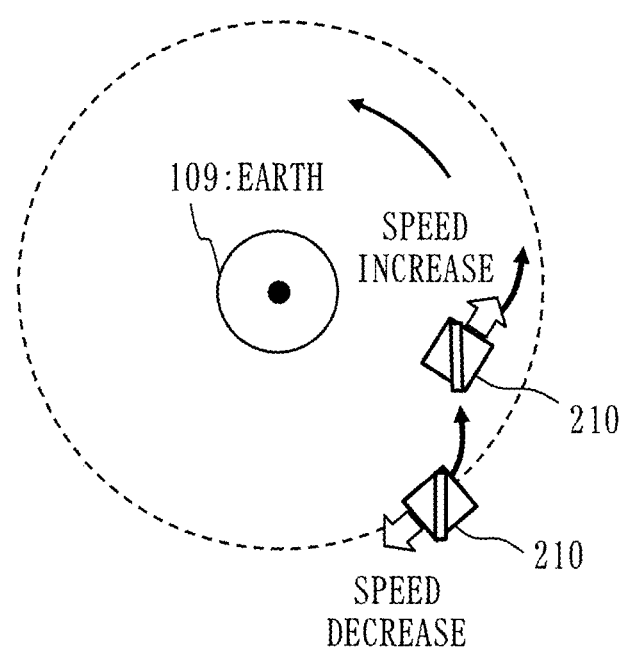
FIG. 15 is a diagram illustrating a relationship between a speed and an altitude of the artificial satellite 210 in Embodiment 2.

Adjustment of the satellite altitude will be described with referring to FIG. 15. A black dot in the Earth 109 represents the North Pole.

When the flight speed of the artificial satellite 210 increases, the altitude of the artificial satellite 210 increases. When the altitude of the artificial satellite 210 increases, a ground speed of the artificial satellite 210 decreases.

When the flight speed of the artificial satellite 210 decreases, the altitude of the artificial satellite 210 decreases. When the altitude of the artificial satellite 210 decreases, the ground speed of the artificial satellite 210 increases.

Figure 16:
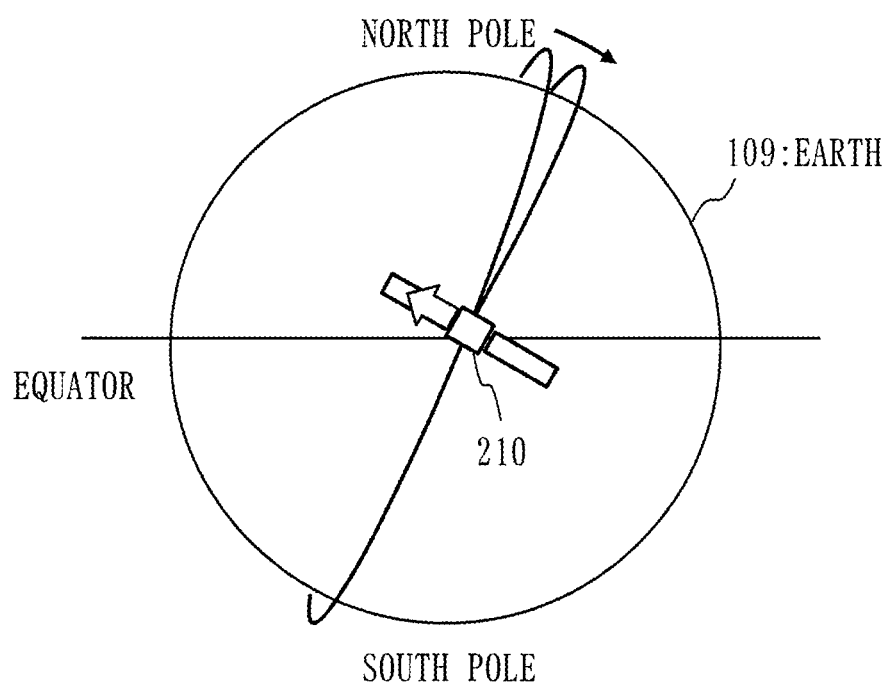
FIG. 16 is a diagram illustrating adjustment of an orbital inclination in Embodiment 2.

Adjustment of the orbital inclination will be described with referring to FIG. 16.

At a point (equinox) at which the artificial satellite 210 flies across the sky above the equator, if the propulsion device 214 generates thrust in a direction perpendicular to the orbital plane, the orbital inclination can be finely adjusted effectively.

A position of the monitoring target and a position of each artificial satellite 210 will be described.

The position of the monitoring target and the position of each artificial satellite 210 can be managed by utilizing a common coordinate system. By utilizing the common coordinate system, each artificial satellite 210 can be controlled in accordance with the position of the monitoring target.

A specific example of the common coordinate system is an Earth-fixed coordinate system. The Earth-fixed coordinate system is a coordinate system adopted by quasi-zenith positioning satellites of Japan and the GPS of the United States.

GPS stands for Global Positioning System.

The satellite control device 222 and the surveillance control device 212 will be described.

The satellite control device 222 can calculate a pointing condition that is optimum for directing toward the monitoring target by taking into consideration a satellite attitude condition in an inertial space.

The satellite control device 222 generates a command that indicates an optimum pointing condition of a corresponding artificial satellite 210. The communication device 221 transmits the generated command to the corresponding artificial satellite 210.

The surveillance control device 212 controls the pointing function of the artificial satellite 210 in accordance with the command from the ground facility 220.

The surveillance control device 212 may control the attitude control device 215 or may control the pointing mechanism of the surveillance device 211.

Construction of the satellite constellation 201 will be described.

To verify a possibility of the satellite constellation 201, one artificial satellite 210 is manufactured, and this one manufactured artificial satellite 210 is put into orbit. The ground facility 220 controls the one artificial satellite 210.

After the possibility of the satellite constellation 201 is verified, other artificial satellites 210 are manufactured and put into their orbits.

Then, the satellite constellation 201 formed of the plurality of artificial satellites 210 is put into operation, and the ground facility 220 controls the plurality of artificial satellites 210.

In a maintenance stage of the satellite constellation 201, maintenance of one to (N−1) artificial satellites 210 may be performed above all. In this case, the ground facility 220 controls the one to (N−1) artificial satellites 210. Note that N is a multiple of 6.

*Effect of Embodiment 2*

According to Embodiment 2, the satellite constellation 201 can be constructed and operated for monitoring the monitoring region constantly.

Embodiment 3

Figure 17:
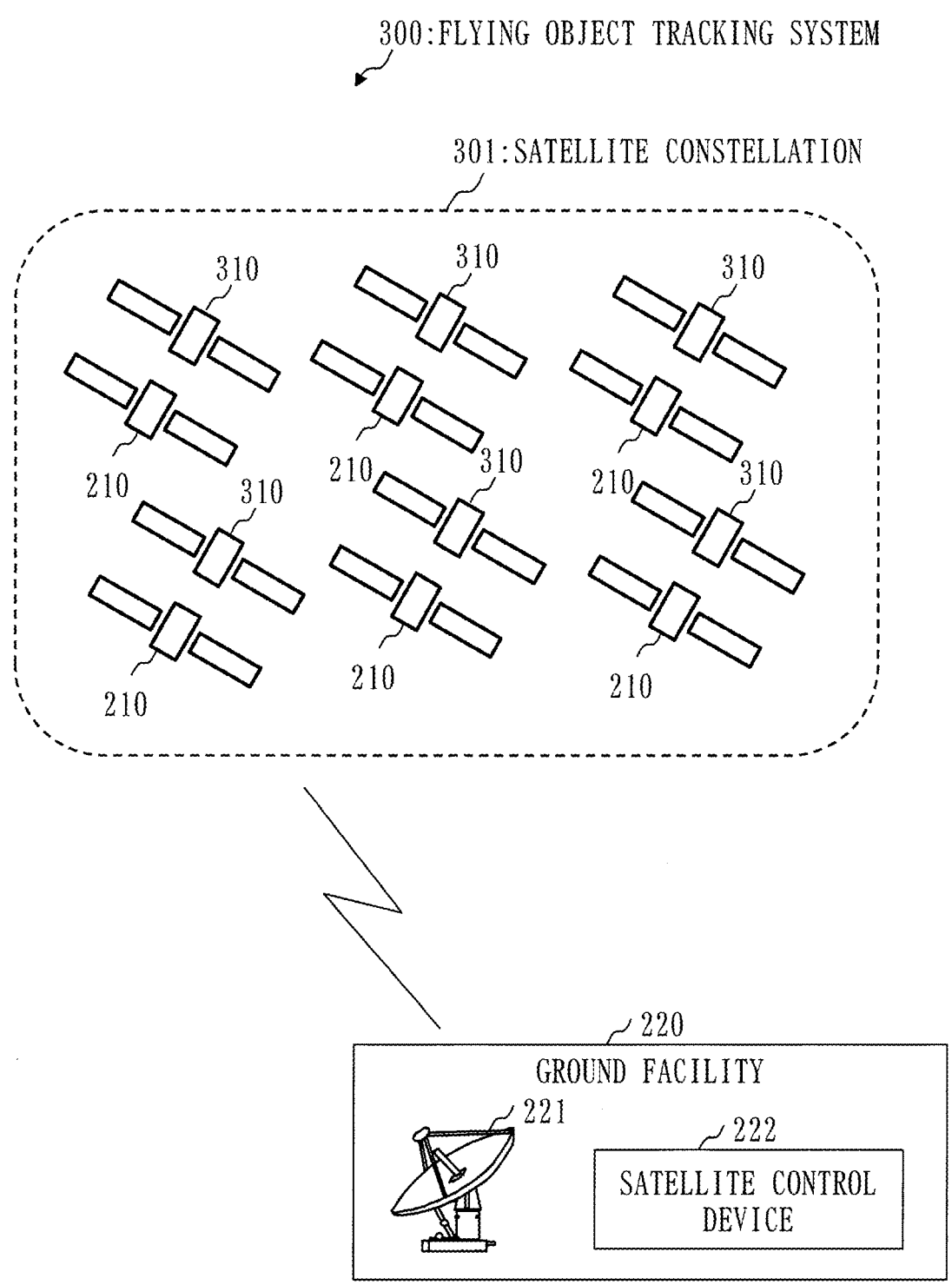
FIG. 17 is a configuration diagram of a flying object tracking system 300 in Embodiment 3.
Figure 18:
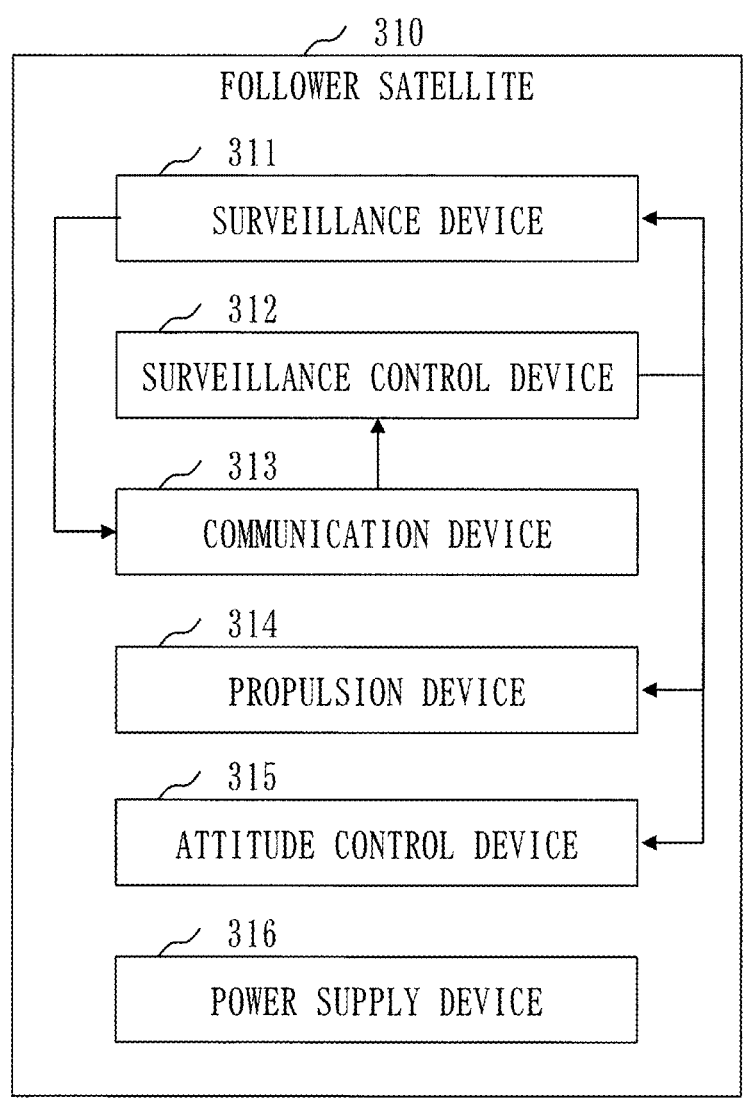
FIG. 18 is a configuration diagram of a follower satellite 310 in Embodiment 3.

A mode of monitoring a flying object will be described mainly regarding its differences from Embodiment 1 and Embodiment 2 with referring to FIGS. 17 and 18.

*Description of Configurations*

A configuration of a flying object tracking system 300 will be described with referring to FIG. 17.

The flying object tracking system 300 is provided with a satellite constellation 301 and a ground facility 220.

The satellite constellation 301 is provided with a plurality of artificial satellites 210 and a plurality of follower satellites 310.

The plurality of follower satellite 310 are a plurality of artificial satellites that fly to follow the plurality of artificial satellites 210.

That is, an artificial satellite 210 and a follower satellite 310 for the artificial satellite 210 fly on the same orbital plane.

A configuration of the artificial satellite 210 is the same as the counterpart configuration (see FIG. 13) in Embodiment 2.

Note that a surveillance device 211 is directed in a geocentric direction and performs monitoring.

A configuration of the follower satellite 310 will be described with referring to FIG. 18.

The follower satellite 310 is provided with a surveillance device 311, a surveillance control device 312, a communication device 313, a propulsion device 314, an attitude control device 315, and a power supply device 316, just as the artificial satellite 210 is.

Note that the surveillance device 311 has a function of changing a field-of-view direction. For example, a pointing function of the attitude control device 315 or follower satellite 310 changes the field-of-view direction of the surveillance device 311.

*Description of Operations*

In each of the plurality of artificial satellites 210, the surveillance device 211 is directed in a geocentric direction and performs monitoring. The surveillance device 211 of at least one artificial satellite 210 detects a flying object launched at an arbitrary time from an arbitrary place.

The artificial satellite 210 provided with the surveillance device 211 that has detected the flying object will be referred to as "detection satellite".

When the surveillance device 211 of the detection satellite detects the flying object, position information of the flying object is transmitted to the follower satellite 310 for the detection satellite, and the follower satellite 310 directs the field-of-view direction of the surveillance device 311 toward the flying object and monitors the flying object.

Specifically, the flying object tracking system 300 operates as follows.

In the detection satellite, the communication device 213 transmits monitor data of the flying object to the ground facility 220.

In the ground facility 220, the communication device 221 receives the monitor data of the flying object. After that, the satellite control device 222 analyzes the monitor data to generate position information indicating a position of the flying object. Then, the communication device 221 transmits the position information of the flying object to the follower satellite 310 for the detection satellite.

In the follower satellite 310, the communication device 313 receives the position information of the flying object. Then, the surveillance device 311 directs the field-of-view direction toward the position indicated by the position information, and monitors the flying object.

*Summary and Supplement of Embodiment 3*

The artificial satellite 210 is equipped with a wide-area surveillance device (surveillance device 211).

The follower satellite 310 is equipped with a high-resolution surveillance device (surveillance device 311) provided with a field-of-view direction change device. The follower satellite 310 flies at the same altitude as that of the artificial satellite 210 and on the same orbital plane as that of the artificial satellite 210 to follow the artificial satellite 210.

The position information of a target (flying object) detected by the surveillance device 211 of the artificial satellite 210 is transmitted to the follower satellite 310 that follows, and the surveillance device 311 of the follower satellite 310 changes a field-of-view direction.

The position information of the target is generated by analysis at the ground facility 220 and is transmitted to the follower satellite 310.

When the ground facility 220 receives the wide-area monitor data acquired by the wide-area surveillance device and detects high-luminance data from the wide-area monitor data, the ground facility 220 analyzes a plume (heated vapor) generated at the time of launch of the flying object. The ground facility 220 converts a detection position of the high-luminance data in the wide-area monitor data into ground-surface position coordinates and communicates the position coordinates to the follower satellite. The ground facility 220 may transmit a command for the field-of-view direction change device of the high-resolution surveillance device.

*Effect of Embodiment 3*

To detect a flying object launched at an arbitrary time and from an arbitrary place, comprehensiveness of wide-area monitoring is necessary. If each artificial satellite 210 is equipped with a wide-area observation device (surveillance device 211) directed in a geocentric direction, an appropriate observation width can be securely obtained in accordance with the orbital altitude, so that constant surveillance of a mid-latitude zone can be realized.

In general, however, it is difficult to realize wide-area monitoring with high resolution in terms of technology and cost. This poses a problem of insufficient resolution when motoring of a high-temperature flying object main body is to be continued after a launch-detected flying object finishes firing.

In view of this, the follower satellite 310 is equipped with the high-resolution surveillance device provided with the field-of-view direction change device. The follower satellite 310 flies on the same orbital plane as that of an artificial satellite 210 to follow the artificial satellite 210, and monitors with high resolution the target detected by the wide-area surveillance device. As a result, the flying object after finishing firing can be monitored with high resolution.

Triggered by launch detection information of the artificial satellite 210 equipped with the wide-area surveillance device, the high-resolution surveillance device is directed in the direction of the flying object. Hence, high-resolution surveillance becomes possible. Also, tracking of the flying object main body after firing is suspended becomes possible.

Regarding this, since the monitoring target is already limited, a monitoring scope may be limited to a narrow area.

Embodiment 4

A mode of monitoring a flying object will be described mainly regarding its difference from Embodiment 3.

*Description of Configuration*

A configuration of a flying object tracking system 300 is the same as the counterpart configuration (see FIG. 17) in Embodiment 3.

*Description of Operations*

In operations of the flying object tracking system 300, a transmitting destination of position information of a flying object is different from a transmitting destination in Embodiment 3.

A ground facility 220 transmits the position information of the flying object to a follower satellite 310 for an artificial satellite 210 on an orbital plane adjacent to an orbital plane of a detection satellite.

The follower satellite 310 receives the position information of the flying object, directs a field-of-view direction of a surveillance device 311 toward a position indicated by the position information, and monitors the flying object.

*Summary and Supplement of Embodiment 4*

Position information of a target (flying object) detected by a wide-area surveillance device (surveillance device 211) is obtained by analysis at the ground facility 220.

The ground facility 220 is equipped with a high-resolution surveillance device (surveillance device 311) and transmits the position information of the target to the follower satellite 310 that flies on an orbital plane adjacent to the orbital plane of the detection satellite.

*Effect of Embodiment 4*

According to Embodiment 4, the position information of the flying object can be transmitted rationally.

Processing that involves the ground facility 220 allows human judgment. However, a delay occurs by an amount of time required for a series of processes. If the time delay is large, it is rational to communicate information to a follower satellite 310 equipped with a high-resolution surveillance device and flying on an adjacent orbital plane, rather than to a follower satellite 310 flying on the same orbital plane as an orbital plane of the detection satellite.

Embodiment 5

Figure 19:
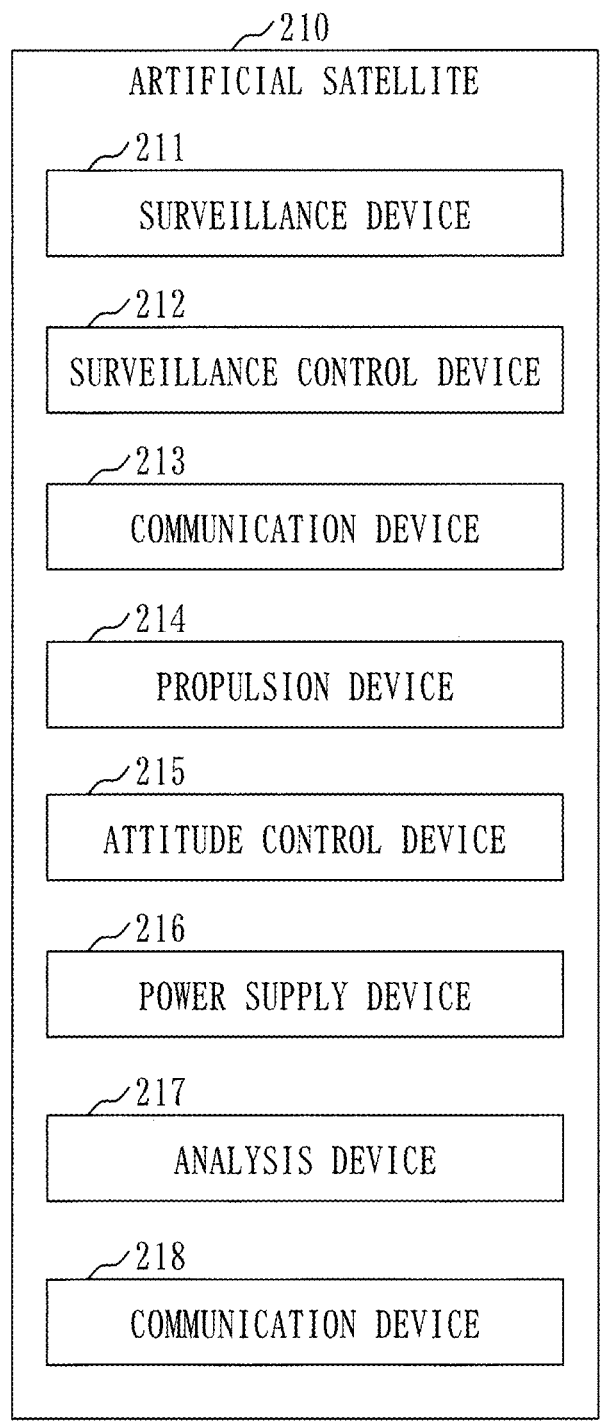
FIG. 19 is a configuration diagram of an artificial satellite 210 in Embodiment 5.
Figure 20:
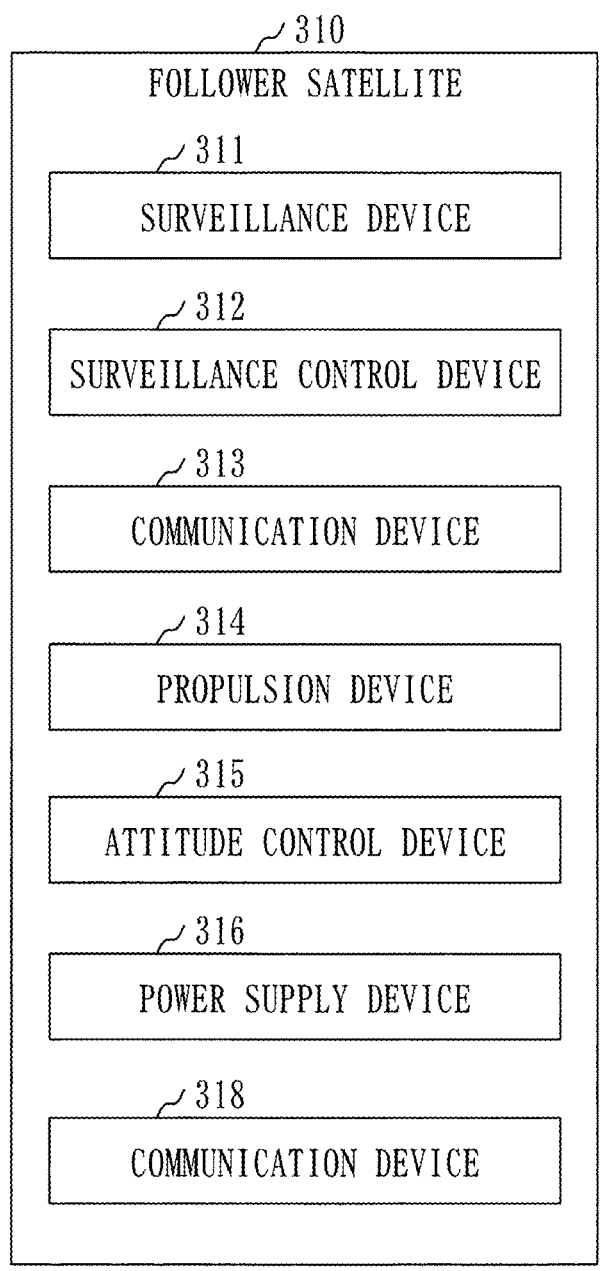
FIG. 20 is a configuration diagram of a follower satellite 310 in Embodiment 5.

A mode of monitoring a flying object will be described with referring to FIGS. 19 and 20 mainly regarding its differences from Embodiment 3 and Embodiment 4.

*Description of Configurations*

A configuration of a flying object tracking system 300 is the same as the counterpart configuration (see FIG. 17) in Embodiment 3.

Note that a configuration of an artificial satellite 210 and a configuration of a follower satellite 310 are different from the counterpart configurations in Embodiment 3.

A configuration of the artificial satellite 210 will be described with referring to FIG. 19.

The artificial satellite 210 is further provided with an analysis device 217 and a communication device 218.

The analysis device 217 as well as a surveillance control device 212 is a computer provided with processing circuit.

The communication device 218 is a communication device to perform inter-satellite communication.

A configuration of the follower satellite 310 will be described with referring to FIG. 20.

The follower satellite 310 is further provided with a communication device 318.

The communication device 318 is a communication device to perform inter-satellite communication.

\*\*\*Description of Operations\*\*\*

In operations of the flying object tracking system 300, a transmitting source of position information (high Earth orbit coordinate values discussed below) of a flying object is different from a transmitting source in Embodiment 3.

When a surveillance device 211 of a detection satellite detects a luminance (high luminance) exceeding a threshold value, the analysis device 217 of the detection satellites calculates coordinate values of a position showing the high luminance on the basis of coordinate values of the detection satellite at a detection time. The calculated coordinate values will be referred to as "high-luminance coordinate values".

The high-luminance coordinate values are transmitted to the follower satellite 310 for the detection satellite, and the follower satellite 310 directs a field-of-view-direction of the surveillance device 311 toward a position identified by the high-luminance coordinate values and performs monitoring.

Specifically, the communication device 218 of the detection satellite communicates with the communication device 318 of the follower satellite 310, thereby transmitting the high-luminance coordinate values to the follower satellite 310.

\*\*\*Summary and Supplement of Embodiment 5\*\*\*

The artificial satellite 210 is equipped with a wide-area surveillance device (surveillance device 211).

The follower satellite 310 flies on the same orbital plane as that of the artificial satellite 210 and at the same altitude as that of the artificial satellite 210 to follow the artificial satellite 210. The follower satellite 310 is equipped with a high-resolution surveillance device (surveillance device 311).

When the wide-area surveillance device detects data exceeding a predetermined luminance, coordinates of a position where the high luminance is detected are calculated by analyzing acquired image information on the basis of position coordinates of the artificial satellite 210 which are taken at the time the data is detected. The position coordinates are transmitted to the follower satellite 310 that follows.

The position coordinates of the artificial satellite 210 can be obtained if, for example, the artificial satellite 210 is equipped with a GPS receiver. GPS stands for Global Positioning System.

Assuming that position coordinates of a center of the image information are the same as coordinates of a ground surface immediately under the artificial satellite 210, the position coordinates corresponding to the high luminance in the acquired image information can be analyzed as relative position coordinates in an observation range shown in the image.

The artificial satellite 210 having the wide-area surveillance device and the follower satellite 310 having the high-resolution surveillance device are equipped with communication devices, and communicate with each other in the front and back at the same altitude and on the same orbital plane.

\*\*\*Effect of Embodiment 5\*\*\*

According to Embodiment 5, a delay time of information communication can be shortened.

Processing that involves the ground facility 220 allows human judgment. However, a delay occurs by an amount of time required for a series of processes. When communicating information to the follower satellite 310 on an adjacent orbit, a communication means must be securely provided for the follower satellite 310 on the adjacent orbit.

If the detection satellite communicates information to a follower satellite 310 that follows on the same orbit, the delay time is shortened.

For example, in an urgent case where information of a flying object being a security threat need be transmitted, the information can be transmitted to the follower satellite 310 equipped with the high-resolution surveillance device without delay time resulting from information communication.

Embodiment 6

A mode of monitoring a flying object will be described mainly regarding its differences from Embodiment 3 through Embodiment 5.

\*\*\*Description of Configurations\*\*\*

A configuration of a flying object tracking system 300 is the same as the counterpart configuration (see FIG. 17) in Embodiment 3. Note that a plurality of communication satellite groups exist to correspond to a plurality of artificial satellites 210 and a plurality of follower satellite 310. One communication satellite group consists of one or more communication satellites.

The plurality of communication satellite groups fly on a plurality of orbital planes on which the plurality of artificial satellites 210 and the plurality of follower satellites 310 fly.

That is, a communication satellite group, an artificial satellite 210 corresponding to the communication satellite group, and a follower satellite 310 corresponding to the communication satellite group fly on the same orbital plane.

The plurality of communication satellite groups may be constituent elements of the flying object tracking system 300.

A configuration of the artificial satellite 210 is the same as the counterpart configuration (see FIG. 19) in Embodiment 5.

A configuration of the follower satellite 310 is the same as the counterpart configuration (see FIG. 20) in Embodiment 5.

\*\*\*Description of Operations\*\*\*

Operations of the flying object tracking system 300 are different from the operations in Embodiment 5 in that position information (high Earth orbit coordinate values) of a flying object is transmitted via the communication satellites.

A communication device 218 of a detection satellite transmits high-luminance coordinate values to a communication satellite flying on the orbital plane of the detection satellite.

The communication satellite communicates with the communication device 318 of the follower satellite 310 for the detection satellite, thereby transmitting the high-luminance coordinate values to the follower satellite 310.

\*\*\*Summary and Supplement of Embodiment 6\*\*\*

The artificial satellite 210 is equipped with a wide-area surveillance device (surveillance device 211).

The follower satellite 310 is equipped with a high-resolution surveillance device (surveillance device 311).

The artificial satellite 210 and the follower satellite 310 are equipped with communication devices, and communicate with each other via communication satellites in the front and back which are located at the same altitude and on the same orbital plane.

\*\*\*Effect of Embodiment 6\*\*\*

The (communication) satellite groups flying at the same altitude and on the same orbital plane communicate with artificial satellites flying in the front and back, so that a ring-shaped communication network spreading around the Earth can be formed. If the artificial satellites 210 equipped with the wide-area surveillance devices and the follower satellites 310 equipped with the high-resolution surveillance devices fly at arbitrary positions in these satellite groups, information can be communicated in a near real-time manner via the ring-shaped communication network.

It goes without saying that even if the communication network does not form a closed ring, near real-time information communication can be performed via the plurality of satellites.

Embodiment 7

A mode of monitoring a flying object will be described mainly regarding its difference from Embodiment 5.

\*\*\*Description of Configuration\*\*\*

A configuration of a flying object tracking system 300 is the same as the counterpart configuration in Embodiment 6.

\*\*\*Description of Operations\*\*\*

In operations of the flying object tracking system 300, a communication satellite via which position information (high Earth altitude orbit coordinate values) of a flying object is transmitted is different from the communication satellite in Embodiment 6.

A communication device 218 of a detection satellite transmits high-luminance coordinate values to a communication satellite flying on an orbital plane adjacent to an orbital plane of the detection satellite.

The communication satellite communicates with a communication device 318 of a follower satellite 310 for the detection satellite, thereby transmitting the high-luminance coordinate values to the follower satellite 310.

\*\*\*Summary and Supplement of Embodiment 7\*\*\*

An artificial satellite 210 is equipped with a wide-area surveillance device (surveillance device 211).

The follower satellite 310 is equipped with a high-resolution surveillance device (surveillance device 311).

The artificial satellite 210 and the follower satellite 310 are equipped with communication devices, and communicate with each other via communication satellites which communicate with satellites in the front and back and on the right and left, on the adjacent orbital plane.

\*\*\*Effect of Embodiment 7\*\*\*

In a case where a large number of satellites fly on a large number of orbital planes to form a mesh-like communication network together, if the artificial satellites 210 equipped with the large-area surveillance devices and the follower satellites 310 equipped with the high-resolution surveillance devices fly at arbitrary positions in satellite groups, information can be communicated in a near real-time manner via a ring-shaped communication network.

Embodiment 8

A mode of monitoring a flying object will be described mainly regarding its differences from Embodiment 3 through Embodiment 7.

\*\*\*Description of Configuration\*\*\*

A configuration of a flying object tracking system 300 is the same as the counterpart configuration in one of Embodiment 3 through Embodiment 7.

Note that a surveillance device 211 of an artificial satellite 210 has a function of changing a field-of-view direction.

Also, in a ground facility 220, a satellite control device 222 has a database on which one or more monitoring target positions are registered. Instead of the ground facility 220, another system may have a database.

\*\*\*Description of Operations\*\*\*

Operations of the flying object tracking system 300 are the same as those in one of Embodiment 3 through Embodiment 7.

Note that the ground facility 220 specifies a monitoring target position selected from a database to the artificial satellite 210. That is, in the ground facility 220, the satellite control device 222 selects the monitoring target position from the database. A communication device 221 transmits the selected monitoring target position to the artificial satellite 210.

The surveillance device 211 of the artificial satellite 210 directs its field-of-view direction toward the monitoring target position on the ground surface and performs monitoring.

\*\*\*Summary and Supplement of Embodiment 8\*\*\*

The surveillance device 211 directed in a geocentric direction is equipped with a field-of-view change device and is directed toward the ground surface.

As preview information, position coordinates of a candidate site for a launch region formed into a database are specified as the monitoring target position coordinates.

A ground system (ground facility 220) is equipped with a database on which traveling routes of a transport-type flying-object launcher and position coordinates of typical points of the transport-type flying-object launcher are registered.

The monitoring target position as a field-of-view change destination must be specified in advance. When detecting launch of a flying object, it is rational to form, as the preview information, a database of position coordinates of candidate sites for a launch region and to specify the position coordinates formed into the database as monitoring target position coordinates.

When detecting launch with a surveillance device equipped with a field-of-view direction change device, it is necessary to specify, as preview information, position coordinates of a candidate site for a launch region, to serve as the monitoring target position coordinates. If, however, transporter erector launcher (TEL) is employed, or if a flying object is to be launched from a submarine, a launch region is difficult to specify.

Meanwhile, using separate preview information, it is possible to grasp an activity range and an activity pattern of the TEL or submarine. Hence, it is possible to register, as a typical point, a place that is likely to be a launch region, including geopolitical learning, on the database.

\*\*\*Effect of Embodiment 8\*\*\*

If a narrow-area field-of-view surveillance device (surveillance device 211) equipped with a field-of-view change device and directed toward the ground surface is employed to substitute for a wide-area field-of-view surveillance device directed in a geocentric direction, a wide-area field-of-view range can be covered comprehensively, and higher-resolution monitoring can be performed.

Embodiment 9

A mode of monitoring a flying object will be described mainly regarding its differences from Embodiment 3 through Embodiment 8.

*Description of Configuration*

A configuration of a flying object tracking system 300 is the same as the counterpart configuration in one of Embodiment 3 through Embodiment 8 except for a configuration of an artificial satellite 210.

The artificial satellite 210 is provided with an infrared surveillance device. A surveillance device 211 may be the infrared surveillance device. The artificial satellite 210 may be provided with a separate infrared surveillance device independently of the surveillance device 211.

The infrared surveillance device is a surveillance device that utilizes infrared rays.

*Description of Operations*

Operations of a satellite constellation 100 are the same as the counterpart operations in one of Embodiment 3 through Embodiment 8.

Note that the infrared surveillance device detects an infrared wavelength other than wavelengths constituting an atmospheric window. The infrared surveillance device is directed in a geocentric direction.

*Summary and Supplement of Embodiment 9*

Wavelengths of 0.2 to 1.2 μm, 1.6 to 1.8 μm, 2 to 2.5 μm, 3.4 to 4.2 μm, 4.4 to 5.5 μm, and 8 to 14 μm constitute the atmospheric window.

The flying object tracking system 300 is equipped with the infrared surveillance device which detects infrared wavelengths other than the atmospheric window and is directed in the geocentric direction.

*Effect of Embodiment 9*

According to Embodiment 9, a flying object can be detected without being influenced by clutter.

In Earth observation from outer space, various types of Earth observation devices that detect wavelengths called atmospheric window are known. The Earth observation devices are used effectively because they detect physical quantities being observation targets, from outer space without being absorbed by the atmosphere.

On the other hand, in infrared surveillance of a flying object gliding in the upper layer of the atmosphere from outer space, when it is attempted to detect wavelengths of the atmospheric window, the wavelengths are buried in infrared radiation called clutter of the ground surface, and the flying object cannot be identified.

The infrared surveillance device detects infrared wavelengths other than the atmospheric window, so that it can detect the flying object without being influenced by clutter.

*Supplement of Embodiments*

Each embodiment is an exemplification of a preferred mode and is not intended to limit the technical scope of the present disclosure. Each embodiment may be carried out partly or in combination with another embodiment.

REFERENCE SIGNS LIST

100: satellite constellation; 109: Earth; 111 to 116: artificial satellite; 200: surveillance system; 201: satellite constellation; 210: artificial satellite; 211: surveillance device; 212: surveillance control device; 213: communication device; 214: propulsion device; 215: attitude control device; 216: power supply device; 220: ground facility; 221: communication device; 222: satellite control device; 300: flying object tracking system; 301: satellite constellation; 310: follower satellite; 311: surveillance device; 312: surveillance control device; 313: communication device; 314: propulsion device; 315: attitude control device; 316: power supply device; 318: communication device.

The invention claimed is:

1. A satellite constellation comprising a plurality of artificial satellites that number a multiple of 6,
   wherein each of the plurality of artificial satellites orbits in an inclined circular orbit a plurality of times a day,
   wherein normals to a plurality of orbital planes corresponding to the plurality of artificial satellites are shifted by an equal angle from each other in an azimuth direction,
   wherein the plurality of orbital planes make up one or more orbital plane sets each consisting of six orbital planes,
   wherein timings at which six artificial satellites orbit are synchronized with each other and on-orbit positions of the 6 artificial satellites are synchronized with each other, on the six orbital planes of each orbital plane set, and
   wherein each of the plurality of artificial satellites includes an infrared surveillance device directed in a geocentric direction and that performs monitoring of a flying object by infrared-ray detection,
   wherein each of the plurality of artificial satellites includes an analysis device,
   each of a plurality of follower satellites includes another surveillance device having a function of changing a field-of-view direction and monitors the detected flying object based on position information transmitted by one of the plurality of artificial satellites, and
   when the infrared surveillance device of an artificial satellite among the plurality of artificial satellites detects a luminance exceeding a threshold value, the analysis device of the artificial satellite calculates coordinate values of a position showing the luminance as luminance coordinate values on a basis of coordinate values of the artificial satellite at a detection time, the luminance coordinate values are transmitted to a follower satellite for the artificial satellite, and the follower satellite directs a field-of-view-direction of the another surveillance device toward a position identified by the luminance coordinate values and performs monitoring.

2. The satellite constellation according to claim 1,
   wherein a number of the plurality of artificial satellites is 6 or 18,
   wherein a timing at which an artificial satellite that orbits on a first orbital plane of each orbital plane set passes through a northernmost end of the first orbital plane is synchronized with
   a timing at which an artificial satellite that orbits on a third orbital plane of each orbital plane set passes through a point that is in-plane phase-shifted by plus 120 degrees from a northernmost end of the third orbital plane,
   a timing at which an artificial satellite that orbits on a fifth orbital plane of each orbital plane set passes through a point that is in-plane phase-shifted by plus 240 degrees from a northernmost end of the fifth orbital plane,
   a timing at which an artificial satellite that orbits on a fourth orbital plane of each orbital plane set passes through a southernmost end of the fourth orbital plane, a timing at which an artificial satellite that orbits on a sixth orbital plane of each orbital plane set passes through a point that is in-plane phase-shifted by plus 120 degrees from a southernmost end of the sixth orbital plane, and a timing at which an artificial satellite that orbits on a second orbital plane of each orbital plane set passes through a point that is in-plane phase-shifted by plus 240 degrees from a southernmost end of the second orbital plane.

3. The satellite constellation according to claim 1,
wherein a number of the plurality of artificial satellites is 12,
wherein a timing at which a first artificial satellite being an artificial satellite that orbits on a first orbital plane of each orbital plane set passes through a northernmost end of the first orbital plane is synchronized with
a timing at which an artificial satellite that orbits on a third orbital plane of each orbital plane set passes through a point that is in-plane phase-shifted by plus 120 degrees from a northernmost end of the third orbital plane, and
a timing at which an artificial satellite that orbits on a fifth orbital plane of each orbital plane set passes through a point that is in-plane phase-shifted by plus 240 degrees from a northernmost end of the fifth orbital plane,
wherein a timing at which a fourth artificial satellite being an artificial satellite that orbits on a fourth orbital plane of each orbital plane set passes through a point on each in-plane phase on the fourth orbital plane is synchronized with
a timing at which an artificial satellite that orbits on a sixth orbital plane of each orbital plane set passes through a point that is in-plane phase-shifted by plus 120 degrees from a point corresponding to an in-plane phase of the fourth artificial satellite on the sixth orbital plane, and
a timing at which an artificial satellite that orbits on a second orbital plane of each orbital plane set passes through a point that is in-plane phase-shifted by plus 240 degrees from a point corresponding to an in-plane phase of the fourth artificial satellite on the second orbital plane, and
wherein in each orbital plane set, the fourth artificial satellite passes through a northernmost end of the fourth orbital plane at a timing when a time that is half an orbiting period elapses after the first artificial satellite passes through the northernmost end of the first orbital plane.

4. The satellite constellation according to claim 1,
wherein a number of the plurality of artificial satellites is 6 or 18,
wherein a timing at which an artificial satellite that orbits on a first orbital plane of each orbital plane set passes through a northernmost end of the first orbital plane is synchronized with
a timing at which an artificial satellite that orbits on a third orbital plane of each orbital plane set passes through a point that is in-plane phase-shifted by minus 120 degrees from a northernmost end of the third orbital plane,
a timing at which an artificial satellite that orbits on a fifth orbital plane of each orbital plane set passes through a point that is in-plane phase-shifted by minus 240 degrees from a northernmost end of the fifth orbital plane,
a timing at which an artificial satellite that orbits on a fourth orbital plane of each orbital plane set passes through a southernmost end of the fourth orbital plane, a timing at which an artificial satellite that orbits on a sixth orbital plane of each orbital plane set passes through a point that is in-plane phase-shifted by minus 120 degrees from a southernmost end of the sixth orbital plane, and a timing at which an artificial satellite that orbits on a second orbital plane of each orbital plane set passes through a point that is in-plane phase-shifted by minus 240 degrees from a southernmost end of the second orbital plane.

5. The satellite constellation according to claim 1,
wherein a number of the plurality of artificial satellites is 12,
wherein a timing at which a first artificial satellite being an artificial satellite that orbits on a first orbital plane of each orbital plane set passes through a northernmost end of the first orbital plane is synchronized with
a timing at which an artificial satellite that orbits on a third orbital plane of each orbital plane set passes through a point that is in-plane phase-shifted by minus 120 degrees from a northernmost end of the third orbital plane, and
a timing at which an artificial satellite that orbits on a fifth orbital plane of each orbital plane set passes through a point that is in-plane phase-shifted by minus 240 degrees from a northernmost end of the fifth orbital plane,
wherein a timing at which a fourth artificial satellite being an artificial satellite that orbits on a fourth orbital plane of each orbital plane set passes through a point on each in-plane phase on the fourth orbital plane is synchronized with
a timing at which an artificial satellite that orbits on a sixth orbital plane of each orbital plane set passes through a point that is in-plane phase-shifted by minus 120 degrees from a point corresponding to an in-plane phase of the fourth artificial satellite on the sixth orbital plane, and
a timing at which an artificial satellite that orbits on a second orbital plane of each orbital plane set passes through a point that is in-plane phase-shifted by minus 240 degrees from a point corresponding to an in-plane phase of the fourth artificial satellite on the second orbital plane, and
wherein in each orbital plane set, the fourth artificial satellite passes through a northernmost end of the fourth orbital plane at a timing when a time that is half an orbiting period elapses after the first artificial satellite passes through the northernmost end of the first orbital plane.

6. A ground facility which performs control to synchronize the plurality of artificial satellites that make up the satellite constellation according to claim 1.

7. A satellite constellation comprising a plurality of artificial satellites that number a multiple of 6,
wherein each of the plurality of artificial satellites is an artificial satellite that performs monitoring by infrared-ray detection, and orbits in an inclined circular orbit a plurality of times a day with a number of times of orbiting that is not an integer multiple,
wherein normals to a plurality of orbital planes corresponding to the plurality of artificial satellites are shifted by an equal angle from each other in an azimuth direction,
wherein the plurality of orbital planes make up one or more orbital plane sets each consisting of six orbital planes, and wherein timings at which six artificial satellites orbit on the six orbital planes of each orbital plane set are synchronized with each other, each of a plurality of follower satellites includes a second surveillance device having a function of changing a field-of-view direction and monitors a detected flying object based on position information transmitted by one of the plurality of artificial satellites, and when a first surveillance device of an artificial satellite among the plurality of artificial satellites detects a luminance exceeding a threshold value, an analysis device of the artificial satellite calculates coordinate values of a position showing the luminance as luminance coordinate values on a basis of coordinate values of the artificial satellite at a detection time, the luminance coordinate values are transmitted to a follower satellite for the artificial satellite, and the follower satellite directs a field-of-view-direction of the second surveillance device toward a position identified by the luminance coordinate values and performs monitoring.

8. A satellite constellation comprising:

a plurality of artificial satellites that number a multiple of 6; and a plurality of follower satellites that fly to follow the plurality of artificial satellites, wherein each of the plurality of artificial satellites includes a first surveillance device directed in a geocentric direction that detects a flying object, each of the plurality of artificial satellites orbits in an inclined circular orbit a plurality of times a day, and each of the plurality of artificial satellites transmits position information regarding a position of the detected flying object, wherein normals to a plurality of orbital planes corresponding to the plurality of artificial satellites are shifted by an equal angle from each other in an azimuth direction, wherein the plurality of orbital planes make up one or more orbital plane sets each consisting of six orbital planes, wherein timings at which six artificial satellites orbit on the six orbital planes of each orbital plane set are synchronized with each other, and each of the plurality of follower satellites includes a second surveillance device having a function of changing a field-of-view direction and monitors the detected flying object based on the position information transmitted by one of the plurality of artificial satellites, wherein each of the plurality of artificial satellites includes an analysis device, and when the first surveillance device of an artificial satellite among the plurality of artificial satellites detects a luminance exceeding a threshold value, the analysis device of the artificial satellite calculates coordinate values of a position showing the luminance as luminance coordinate values on a basis of coordinate values of the artificial satellite at a detection time, the luminance coordinate values are transmitted to the follower satellite for the artificial satellite, and the follower satellite directs a field-of-view-direction of the second surveillance device toward a position identified by the luminance coordinate values and performs monitoring.

9. The satellite constellation according to claim 8, wherein when the first surveillance device of an artificial satellite among the plurality of artificial satellites detects a flying object, position information of the flying object is transmitted to the follower satellite for the artificial satellite, and the follower satellite directs the field-of-view direction of the second surveillance device toward the flying object and monitors the flying object.

10. The satellite constellation according to claim 9, wherein the artificial satellite transmits monitor data of the flying object to a ground facility, wherein the ground facility analyzes the monitor data to generate position information of the flying object, and transmits the position information to the follower satellite, and wherein the follower satellite receives the position information, directs a field-of-view direction of the second surveillance device toward a position indicated by the position information, and monitors the flying object.

11. The satellite constellation according to claim 8, wherein when the first surveillance device of an artificial satellite among the plurality of artificial satellites detects a flying object, the artificial satellite transmits monitor data of the flying object to a ground facility, wherein the ground facility analyzes the monitor data to generate position information of the flying object, and transmits the position information to a follower satellite for an artificial satellite on an orbital plane adjacent to the orbital plane of the artificial satellite, and wherein the follower satellite receives the position information, directs a field-of-view direction of the second surveillance device toward a position indicated by the position information, and monitors the flying object.

12. The satellite constellation according to claim 8, wherein each of the plurality of artificial satellites and each of the plurality of follower satellites each includes a communication device for inter-satellite communication, and the communication device of the artificial satellite communicates with the communication device of the follower satellite, thereby transmitting the luminance coordinate values to the follower satellite.

13. The satellite constellation according to claim 8, wherein each of the plurality of artificial satellites and each of the plurality of follower satellites each includes a communication device for inter-satellite communication, wherein the communication device of the artificial satellite transmits the luminance coordinate values to a communication satellite flying on the orbital plane of the artificial satellite, and wherein the communication satellite communicates with the communication device of the follower satellite, thereby transmitting the luminance coordinate values to the follower satellite.

14. The satellite constellation according to claim 8, wherein each of the plurality of artificial satellites and each of the plurality of follower satellites each include a communication device for inter-satellite communication, wherein the communication device of the artificial satellite transmits the luminance coordinate values to a communication satellite flying on an orbital plane adjacent to the orbital plane of the artificial satellite, and wherein the communication satellite communicates with the communication device of the follower satellite, thereby transmitting the luminance coordinate values to the follower satellite.

15. A flying object tracking system comprising the satellite constellation according to claim 8,
wherein the first surveillance device of each of the plurality of artificial satellites has a function of changing a field-of-view direction, and
wherein the first surveillance device of an artificial satellite among the plurality of artificial satellites directs a field-of-view direction toward a monitoring target position on a ground surface and performs monitoring.

16. The flying object tracking system according to claim 15, comprising a ground facility having a database on which one or more monitoring target positions are registered, and
wherein the ground facility specifies the monitoring target position selected from the database to the artificial satellite.

17. The flying object tracking system according to claim 15,
wherein each of the plurality of artificial satellites includes an infrared surveillance device, and
wherein the infrared surveillance device detects infrared wavelengths other than wavelengths constituting an atmospheric window and is directed in a geocentric direction.

18. A satellite constellation comprising a plurality of artificial satellites that number a multiple of 6,
wherein each of the plurality of artificial satellites orbits in an inclined circular orbit a plurality of times a day,
wherein normals to a plurality of orbital planes corresponding to the plurality of artificial satellites are shifted by an equal angle from each other in an azimuth direction,
wherein the plurality of orbital planes make up one or more orbital plane sets each consisting of six orbital planes,
wherein timings at which six artificial satellites orbit are synchronized with each other and on-orbit positions of the 6 artificial satellites are synchronized with each other, on the six orbital planes of each orbital plane set, and
wherein each of the plurality of artificial satellites includes an infrared surveillance device directed in a geocentric direction and that performs monitoring of a flying object by infrared-ray detection,
wherein each of the plurality of artificial satellites includes an analysis device, and
wherein when the infrared surveillance device of an artificial satellite among the plurality of artificial satellites detects a luminance exceeding a threshold value, the analysis device of the artificial satellite calculates coordinate values of a position showing the luminance as luminance coordinate values on a basis of coordinate values of the artificial satellite at a detection time, the luminance coordinate values are transmitted to a follower satellite that follows the artificial satellite, and the follower satellite directs a field-of-view-direction of another surveillance device in the artificial satellite toward a position identified by the luminance coordinate values and performs monitoring.

* * * * *